(12) United States Patent
Kawamura et al.

(10) Patent No.: US 9,616,573 B2
(45) Date of Patent: Apr. 11, 2017

(54) ROBOT CONTROL APPARATUS, ROBOT CONTROL METHOD, PROGRAM, RECORDING MEDIUM AND ROBOT SYSTEM

(71) Applicant: THE RITSUMEIKAN TRUST, Kyoto (JP)

(72) Inventors: Sadao Kawamura, Shiga (JP); Hiroyuki Onishi, Kyoto (JP)

(73) Assignee: THE RITSUMEIKAN TRUST (JP)

( * ) Notice: Subject to any disclaimer, the term of this patent is extended or adjusted under 35 U.S.C. 154(b) by 0 days.

(21) Appl. No.: 14/403,817

(22) PCT Filed: May 23, 2013

(86) PCT No.: PCT/JP2013/064324
§ 371 (c)(1),
(2) Date: Nov. 25, 2014

(87) PCT Pub. No.: WO2013/176212
PCT Pub. Date: Nov. 28, 2013

(65) Prior Publication Data
US 2015/0158181 A1    Jun. 11, 2015

(30) Foreign Application Priority Data

May 25, 2012  (JP) ................................ 2012-119535
Sep. 14, 2012  (JP) ................................ 2012-202999

(51) Int. Cl.
*B25J 9/16*  (2006.01)

(52) U.S. Cl.
CPC ... *B25J 9/1697* (2013.01); *G05B 2219/39393* (2013.01); *G05B 2219/42034* (2013.01);
(Continued)

(58) Field of Classification Search
CPC ....... B26D 5/007; B25J 9/1697; B25J 19/023; G06T 1/0014
See application file for complete search history.

(56) References Cited

U.S. PATENT DOCUMENTS 5,838,882 A * 11/1998 Gan ...................... B25J 9/1694
                                                                 700/259
6,278,906 B1 * 8/2001 Piepmeier .............. B25J 9/1607
                                                                 700/245
(Continued)

FOREIGN PATENT DOCUMENTS

JP      05-228863      9/1993
JP      2007-011978    1/2007

OTHER PUBLICATIONS

Bonfe, Marcello et al. Variable Structure PID Based Visual Servoing for Robotic Tracking and Manipulation, 2002, IEEE/RSJ Intl Conference on Intellegent Robots and Systems, all.*

(Continued)

*Primary Examiner* — Khoi Tran
*Assistant Examiner* — Ryan Rink
(74) *Attorney, Agent, or Firm* — Ostrolenk Faber LLP

(57) ABSTRACT

An end effector can be removed to a target position and calibration loads can be reduced, even if there is an error in a kinematic operation in a robot main body and/or cameras. A positional deviation integral torque obtained by integrating a value corresponding to a positional deviation is applied to joints while being superimposed with torques based on angular deviations. If movements of the joints stop or are about to stop before the end effector reaches a target position due to an error in a kinematic operation, the positional deviation integral torque increases with time, to move said joints and move the end effector to the target position. Thus, the end effector can be reliably moved to the target position
(Continued)

by the positional deviation integral torque, and calibration loads can be reduced.

14 Claims, 15 Drawing Sheets

(52) U.S. Cl.
CPC ............ *Y10S 901/02* (2013.01); *Y10S 901/28* (2013.01); *Y10S 901/47* (2013.01)

(56) References Cited

U.S. PATENT DOCUMENTS

| | | | |
|---|---|---|---|
| 2007/0255454 A1* | 11/2007 | Dariush | G06N 3/008 700/245 |
| 2012/0307027 A1* | 12/2012 | Popovic | B25J 9/1697 348/65 |
| 2016/0008988 A1* | 1/2016 | Kennedy | B25J 9/06 414/738 |

OTHER PUBLICATIONS

Chien Chern Cheah, Approximate Jacobian Control for Robots With Uncertain Kinematics and Dynamics, IEEE Transactions on Robotics and Automation, vol. 19, No. 4, Aug. 2003.*

International Search Report and Written Opinion mailed Aug. 27, 2013 in corresponding PCT International Application No. PCT/JP2013/064324.

Written Opinion mailed Aug. 27, 2013 in corresponding PCT International Application No. PCT/JP2013/064324, along with English translation thereof.

English translation of Declaration as to Non-Prejudicial Disclosures or Exceptions to Lack of Novelty, p. 5 of PCT Request.

Chien Chern Cheah et al., "Approximate Jacobian Control for Robots with Uncertain Kinematics and Dynamics," IEEE Transactions on Robotics and Automation, 19(4):692-702, Aug. 2003.

* cited by examiner

F I G. 2
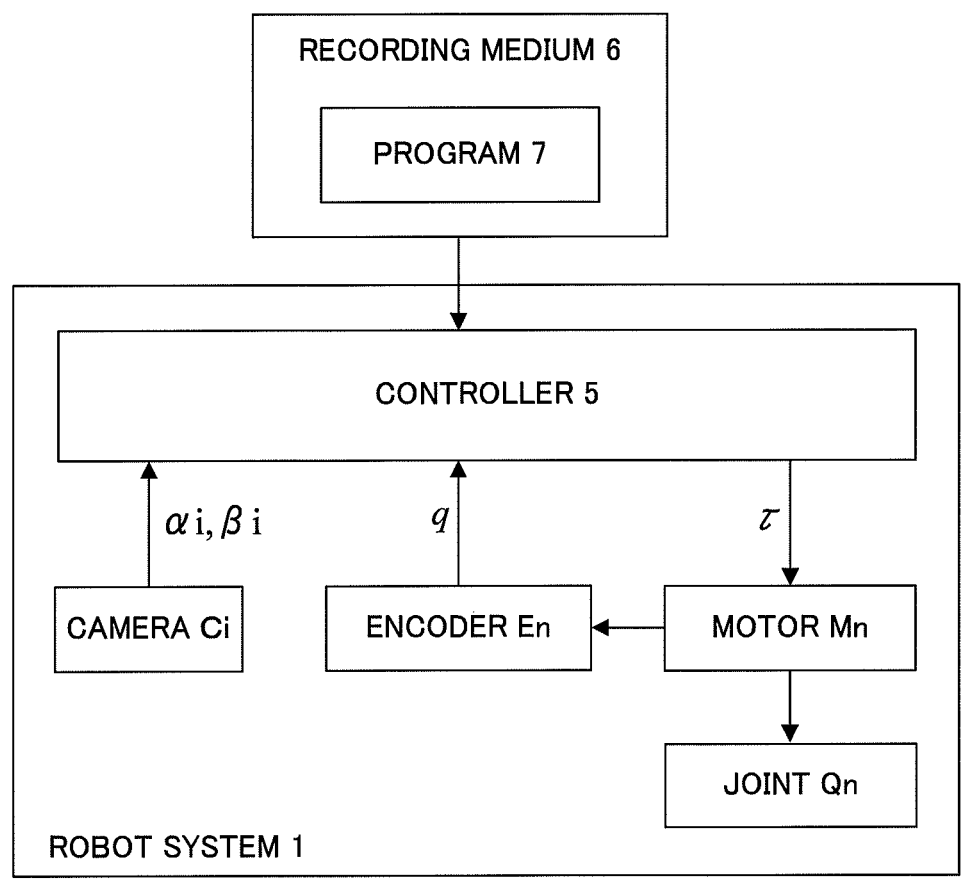

F I G. 6
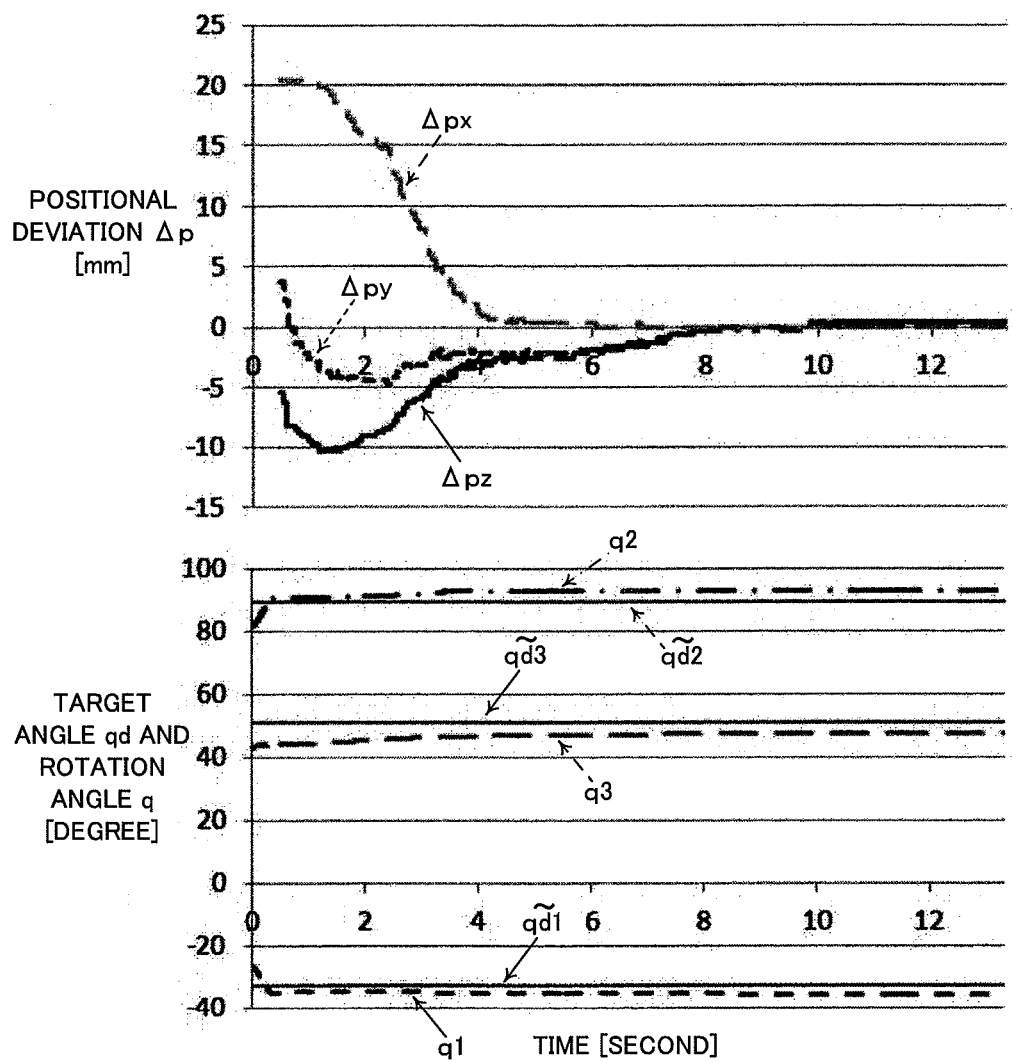

|    | $G_P$ | $G_D$ | $G_{Pc1}$ | $G_{Pc2}$ | $G_{Pc3}$ | $G_{Ic1}$ | $G_{Ic2}$ | $G_{Ic3}$ |
|----|-------|-------|-----------|-----------|-----------|-----------|-----------|-----------|
| q1 | 100.0 | 100.0 | 0.20 | 0.10 | 0.10 | 0.006 | 0.004 | 0.004 |
| q2 | 100.0 | 100.0 | 0.20 | 0.10 | 0.10 | 0.006 | 0.004 | 0.004 |
| q3 | 100.0 | 100.0 | 0.20 | 0.10 | 0.10 | 0.006 | 0.004 | 0.004 |
| q4 | 100.0 | 40.0  | 0.20 | 0.10 | 0.10 | 0.006 | 0.004 | 0.004 |
| q5 | 100.0 | 60.0  | 0.20 | 0.10 | 0.10 | 0.006 | 0.004 | 0.004 |
| q6 | 100.0 | 40.0  | 0.20 | 0.10 | 0.10 | 0.006 | 0.004 | 0.004 |

|     | $G_P$ | $G_D$ | $G_{Pc1}$ | $G_{Pc2}$ | $G_{Pc3}$ | $G_{Ic1}$ | $G_{Ic2}$ | $G_{Ic3}$ |
|-----|-------|-------|-----------|-----------|-----------|-----------|-----------|-----------|
| q1  | 400   | 500   | 0         | 0         | 0         | 0.02      | 0.032     | 0.02      |
| q2  | 400   | 450   | 0         | 0         | 0         | 0.02      | 0.032     | 0.02      |
| q3  | 400   | 400   | 0         | 0         | 0         | 0.02      | 0.032     | 0.02      |
| q4  | 400   | 300   | 0         | 0         | 0         | 0.02      | 0.032     | 0.02      |
| q5  | 400   | 300   | 0         | 0         | 0         | 0.02      | 0.032     | 0.02      |
| q6  | 400   | 200   | 0         | 0         | 0         | 0.02      | 0.032     | 0.02      |

DISTANCE DEVIATION PER MARKER
(THREE-POINT CONTROL : IN CASE OF INTEGRAL TERM ONLY)

|    | $G_P$ | $G_D$ | $G_{Pc1}$ | $G_{Pc2}$ | $G_{Pc3}$ | $G_{Ic1}$ | $G_{Ic2}$ | $G_{Ic3}$ |
|----|-------|-------|-----------|-----------|-----------|-----------|-----------|-----------|
| q1 | 100.0 | 100.0 | 0.10 | 0.05 | 0.05 | 0.04 | 0.02 | 0.02 |
| q2 | 100.0 | 100.0 | 0.10 | 0.05 | 0.05 | 0.04 | 0.02 | 0.02 |
| q3 | 100.0 | 100.0 | 0.10 | 0.05 | 0.05 | 0.04 | 0.02 | 0.02 |
| q4 | 100.0 | 40.0  | 0.10 | 0.05 | 0.05 | 0.04 | 0.02 | 0.02 |
| q5 | 100.0 | 60.0  | 0.10 | 0.05 | 0.05 | 0.04 | 0.02 | 0.02 |
| q6 | 100.0 | 40.0  | 0.10 | 0.05 | 0.05 | 0.04 | 0.02 | 0.02 |

ERROR DEVIATION PER MARKER

|    | $G_P$ | $G_D$ | $G_{Pc1}$ | $G_{Pc2}$ | $G_{Pc3}$ | $G_{Ic1}$ | $G_{Ic2}$ | $G_{Ic3}$ |
|----|-------|-------|-----------|-----------|-----------|-----------|-----------|-----------|
| q1 | 100.0 | 100.0 | 0.050 | 0.080 | 0.050 | 0.020 | 0.032 | 0.020 |
| q2 | 100.0 | 100.0 | 0.050 | 0.080 | 0.050 | 0.020 | 0.032 | 0.020 |
| q3 | 100.0 | 100.0 | 0.050 | 0.080 | 0.050 | 0.020 | 0.032 | 0.020 |
| q4 | 100.0 | 40.0  | 0.050 | 0.080 | 0.050 | 0.020 | 0.032 | 0.020 |
| q5 | 100.0 | 60.0  | 0.050 | 0.080 | 0.050 | 0.020 | 0.032 | 0.020 |
| q6 | 100.0 | 40.0  | 0.050 | 0.080 | 0.050 | 0.020 | 0.032 | 0.020 |

|  | $G_P$ | $G_D$ | $G_{Pc1}$ | $G_{Pc2}$ | $G_{Pc3}$ | $G_{Pc4}$ | $G_{Pc5}$ |
|---|---|---|---|---|---|---|---|
| q1 | 100.0 | 100.0 | 0.020 | 0.040 | 0.020 | 0.020 | 0.020 |
| q2 | 100.0 | 100.0 | 0.020 | 0.040 | 0.020 | 0.020 | 0.020 |
| q3 | 100.0 | 100.0 | 0.020 | 0.040 | 0.020 | 0.020 | 0.020 |
| q4 | 100.0 | 40.0 | 0.020 | 0.040 | 0.020 | 0.020 | 0.020 |
| q5 | 100.0 | 60.0 | 0.020 | 0.040 | 0.020 | 0.020 | 0.020 |
| q6 | 100.0 | 40.0 | 0.020 | 0.040 | 0.020 | 0.020 | 0.020 |

|  | $G_{Ic1}$ | $G_{Ic2}$ | $G_{Ic3}$ | $G_{Ic4}$ | $G_{Ic5}$ |
|---|---|---|---|---|---|
| q1 | 0.005 | 0.008 | 0.005 | 0.005 | 0.005 |
| q2 | 0.005 | 0.008 | 0.005 | 0.005 | 0.005 |
| q3 | 0.005 | 0.008 | 0.005 | 0.005 | 0.005 |
| q4 | 0.005 | 0.008 | 0.005 | 0.005 | 0.005 |
| q5 | 0.005 | 0.008 | 0.005 | 0.005 | 0.005 |
| q6 | 0.005 | 0.008 | 0.005 | 0.005 | 0.005 |

DISTANCE DEVIATION PER MARKER (FIVE-POINT MARKER)

ROBOT CONTROL APPARATUS, ROBOT CONTROL METHOD, PROGRAM, RECORDING MEDIUM AND ROBOT SYSTEM

CROSS-REFERENCE TO RELATED APPLICATIONS

The present application is a 35 U.S.C. §§371 national phase conversion of PCT/JP2013/064324, filed May 23, 2013, which claims priority to Japanese Application Nos. 2012-119535, filed May 25, 2012, and 2012-202999, Sep. 14, 2012, the contents of all of which are incorporated herein by reference. The PCT International Application was published in the Japanese language.

TECHNICAL FIELD

This invention relates to a robot including a freely displaceable joint and configured to move an end effector according to a displacement of the joint and particularly to a technology to move an end effector to a target position by controlling a displacement of a joint based on a result of imaging the end effector.

BACKGROUND ART

Patent literature 1 proposes a control using a visual feedback to move an end effector to a target position by controlling the rotation of a joint of a robot based on a result of imaging the end effector by a camera. In the control by such a visual feedback, positional information of the end effector is obtained from the imaging result of the camera. The positional information of the end effector obtained in this way is converted into a rotation control amount for controlling the rotation of the joint. By controlling the rotation of the joint based on this rotation control amount, the end effector can be moved to the target position.

Further, non-patent literature 1 proposes a control law including a term for converting positional information of an end effector into a torque of a joint as a rotation control amount. This control law includes a kinematic operation term for converting the positional information of the end effector into the torque of the joint by operating a transposed Jacobian matrix to a positional deviation e (positional information) between an actual position X and a target position Xd of the end effector. By this operation term, a torque executing a proportional control based on the positional deviation e (=Xd−X) of the end effector (proportional torque based on the positional deviation) acts on the joint to rotate the joint in a direction to reduce the positional deviation e and move the end effector to the target position Xd. Further, the positional deviation e obtained from the imaging result of the camera may be applied to the operation term of the control law to apply this control law to a robot control by the visual feedback.

CITATION LIST

Patent Literature

PTL 1: JP2007-011978A

Non Patent Literature

NPL 1: Cheah, C. C., M. Hirano, Kawamura, S. and Arimoto, S. (2003). "Approximate Jacobian Control for Robots with Uncertain Kinematics and Dynamics." IEEE Transactions on Robotics and Automation, 19(4), 692-702

SUMMARY OF INVENTION

Technical Problem

However, in this control law, there have been cases where the end effector cannot be brought closer to the target position if the positional deviation of the end effector cannot be precisely obtained such as because the end effector is hidden behind an obstacle between the end effector and the camera. This is because the torque generated by the above operation term does not necessarily act to reduce the positional deviation of the end effector unless a precise positional deviation of the end effector is obtained.

To cope with this problem, it may be considered to add a term for generating a torque for executing a proportional control based on an angular deviation between a target angle and an actual rotation angle of the joint (proportional torque based on the angular deviation) to the control law. Here, the target angle of the joint is equivalent to a rotation angle of the joint of the robot when the end effector is at the target position. That is, by adding such a term, the end effector can be brought closer to the target position by applying a proportional torque to the joint to rotate in a direction to reduce the angular deviation. In addition, the rotation angle can be detected by an internal sensor attached to the joint. Accordingly, even if the positional deviation of the end effector cannot be obtained, the angular deviation of the joint can be obtained from a detection result of the internal sensor. Thus, the end effector can be brought closer to the target position by applying the proportional torque based on the angular deviation to the joint. If the positional deviation of the end effector can be obtained again, it can be expected to properly move the end effector to the target position by the proportional torque based on this positional deviation.

However, the following problem might occur because the proportional torque based on the positional deviation of the end effector and the proportional torque based on the angular deviation of the joint are superimposed and act on the joint. That is, since the target angle of the joint is obtained by applying a kinematic operation to information obtained from the camera, the target angle of the joint possibly has an error. Thus, the proportional torque based on the angular deviation and including an error may act on the torque obtained as the proportional torque based on the positional deviation in an opposite direction to stop the rotation of the joint while the end effector is brought closer to the target position. In other words, before the end effector reaches the target position, these torques may be balanced out each other to stop the rotation of the joint and the end effector may stop at a position deviated from the target position.

As one measure to cope with such a problem, a configuration capable of precisely performing a kinematic operation is considered. To that end, it is necessary to highly accurately calibrate parameters of the camera, a positional relationship of the camera and the robot, etc. However, such highly accurate calibration imposes tremendous loads on a user in terms of time and cost.

This invention was developed in view of the above problem and aims to provide a technology enabling an end effector to be moved to a target position even if there is an error in a kinematic operation and capable of reducing loads of calibration.

Solution to Problem

To achieve the above aim, a robot control apparatus according to the invention pertains to a robot control apparatus, which controls a robot configured to include a freely displaceable joint and move an end effector according to a displacement of the joint, and comprises: an imager to image a reference position provided on the robot while capturing the reference position and a destination of the reference position in a field of view; a displacement amount detector to detect a displacement amount of the joint; a positional deviation acquirer to acquire a positional deviation from the destination for the reference position based on an imaging result of the imager; an application amount calculator to calculate a first application amount from a result of acquiring an value of integral acquired by performing an integral operation on a value corresponding to the positional deviation for the reference position and a second application amount by performing a proportional operation on a value corresponding to a displacement amount deviation between a detected displacement amount by the displacement amount detector and a target displacement amount which is the displacement amount of the joint when the reference position coincides with the corresponding destination, as an application amount which is a force or a torque applied to the joint to displace the joint; and a drive controller to move the reference position to the destination thereof by applying the first application amount and second application amount to the joint.

To achieve the above aim, a robot control method according to the invention pertains to a robot control method, which controls a robot configured to include a freely displaceable joint and move an end effector according to a displacement of the joint, and comprises: a step of imaging a reference position provided on the robot while capturing the reference position and a destination of the reference position in a field of view; a step of acquiring a positional deviation from the destination for the reference position based on an imaging result of the reference position; a step of acquiring a detected displacement amount by detecting a displacement amount of the joint; a step of calculating a first application amount from a result of acquiring an value of integral acquired by performing an integral operation on a value corresponding to the positional deviation for the reference position and a second application amount by performing a proportional operation on a value corresponding to a displacement amount deviation between the detected displacement amount and a target displacement amount which is the displacement amount of the joint when the reference position coincides with the corresponding destination, as an application amount which is a force or a torque applied to the joint to displace the joint; and a step of moving the reference position to the destination thereof by applying the first application amount and second application amount to the joint.

To achieve the above aim, a robot control program according to the invention pertains to a robot control program, which causes a computer to control a robot configured to include a freely displaceable joint and move an end effector according to a displacement of the joint, and causes the computer to perform: a step of imaging a reference position provided on the robot while capturing the reference position and a destination of the reference position in a field of view; a step of acquiring a positional deviation from the destination for the reference position based on an imaging result of the reference position; a step of acquiring a detected displacement amount by detecting a displacement amount of the joint; a step of calculating a first application amount from a result of acquiring an value of integral acquired by performing an integral operation on a value corresponding to the positional deviation for the reference position and a second application amount by performing a proportional operation on a value corresponding to a displacement amount deviation between the detected displacement amount and a target displacement amount which is the displacement amount of the joint when the reference position coincides with the corresponding destination, as an application amount which is a force or a torque applied to the joint to displace the joint; and a step of moving the reference position to the destination thereof by applying the first application amount and second application amount to the joint.

To achieve the above aim, a recording medium according to the invention records above program in a computer-readable manner.

To achieve the above aim, a robot system according to the invention comprises: a robot configured to include a freely displaceable joint and move an end effector according to a displacement of the joint; an imager to image a reference position provided on the robot while capturing the reference position and a destination of the reference position in a field of view; a displacement amount detector to detect a displacement amount of the joint; a positional deviation acquirer to acquire a positional deviation from the destination for the reference position based on an imaging result of the imager; an application amount calculator to calculate a first application amount from a result of acquiring an value of integral acquired by performing an integral operation on a value corresponding to the positional deviation for the reference position and a second application amount by performing a proportional operation on a value corresponding to a displacement amount deviation between a detected displacement amount by the displacement amount detector and a target displacement amount which is the displacement amount of the joint when the reference position coincides with the corresponding destination, as an application amount which is a force or a torque applied to the joint to displace the joint; and a drive controller to move the reference position to the destination thereof by applying the first application amount and second application amount to the joint.

The thus configured invention (robot control apparatus, robot control method, program, recording medium, robot system) controls the position of the end effector by moving the reference position provided on the robot toward the destination thereof. Specifically, the reference position is imaged in a state where the destination of the reference position is captured in the field of view and the displacement amount of the joint is detected. The application amount that is a force or a torque applied to the joint to displace the joint is calculated based on these results. That is, the first application amount based on the positional deviation from the destination acquired for the reference position is calculated from the imaging result and the second application amount based on the displacement amount deviation between the target displacement amount and the detected displacement amount of the joint is calculated. These first and second application amounts are superimposed and applied to the joint. In such a configuration, the displacement amount of the joint can be detected even if the positional deviation of the reference position cannot be acquired from the imaging result. Thus, the reference position can be brought closer to the destination by displacing the joint by the second application amount based on the displacement amount deviation, as a result the end effector can be moved toward the target position.

However, as described above, in the configuration where the application amount based on the positional deviation and application amount based on the displacement amount deviation of the joint are superimposed and applied to the joint, the application amount based on the positional deviation may act in a direction opposite to the application amount based on the displacement amount deviation to stop the displacement of the joint unless a kinematic operation is certain. In this case, the end effector stops with the positional deviation left. Similarly to this, in the configuration where the first application amount based on the positional deviation between the reference position and the destination and the second application amount based on the displacement amount deviation are superimposed and applied to the joint, the joint may stop with the positional deviation left and the end effector may stop at a position deviated from the target position since the kinematic operation is uncertain.

Contrary to this, in the invention, the first application amount to be applied to the joint while being superimposed with the second application amount is acquired by performing the integral operation on the value corresponding to the positional deviation of the reference position. Thus, if the joint stops or is about to stop before the reference position reaches the destination, the positional deviation remains, therefore, the first application amount increases with time to move the joint that has stopped or is about to stop. This first application amount keeps the joint moving to move the reference position to the destination until the positional deviation is finally eliminated. As a result, the end effector can be moved to the target position. Thus, in the invention, the end effector can be reliably moved to the target position by the function of the first application amount even if there is an error in the kinematic operation. As a result, highly accurate calibration is not required and loads of calibration can be reduced.

On this occasion, the robot control apparatus, which controls the robot to move the end effector according to the rotation of the joint, may be configured so that the imager images the reference position provided on the end effector while capturing the reference position and the destination of the reference position; the displacement amount detector is an angle detector to detect a rotation angle of the joint; and the application amount calculator is a torque calculator to calculate a first torque as the first application amount by performing the integral operation on the value corresponding to the positional deviation and a second torque as the second application amount by performing the proportional operation on a value corresponding to an angular deviation between a detected angle by the angle detector and a target angle as the target displacement amount which is the rotation angle of the joint when the reference position is at the destination; and the drive controller controls a joint drive mechanism to drive the joint so as to apply the first and second torques to the joint.

In the thus configured invention, the reference position is imaged while the destination (target position) of the reference position provided on the end effector is included in the field of view, and the rotation angle of the joint is detected. Then, the first torque based on the positional deviation between the destination and the reference position of the end effector (i.e. position of the end effector) is calculated based on the imaging result and the second torque is calculated based on the angular deviation between the target angle and the detected angle of the joint. Then, these first and second torques are superimposed and applied to the joint. In such a configuration, since the rotation angle of the joint can be detected even if the positional deviation of the reference position of the end effector cannot be acquired from the imaging result, the reference position of the end effector is brought closer to the destination by rotating the joint by the second torque based on the angular deviation. However, for a reason similar to the above, in the configuration where these first and second torques are superimposed and applied to the joint, the rotation of the joint may stop and the end effector may stop at a position deviated from the target position before the reference position of the end effector reaches the destination if there is an error in the kinematic operation.

Contrary to this, in the invention, the first torque applied to the joint while being superimposed with the second torque is acquired by performing the integral operation on the value corresponding to the positional deviation of the reference position of the end effector. Thus, if the joint stops or is about to stop before the reference position reaches the destination due to an error in the kinematic operation, the first torque increases with time to move the joint that has stopped or is about to stop. This first torque keeps the joint moving to move the end effector to the target position until the positional deviation is finally eliminated. Therefore, the end effector can be reliably moved to the target position by the function of the first torque even if there is an error in the kinematic operation. As a result, highly accurate calibration is not required and loads of calibration can be reduced.

On this occasion, the robot control apparatus may be configured so that the torque calculator calculates a third torque by performing a proportional operation on the value corresponding to the positional deviation; and the drive controller controls the joint drive mechanisms so that the third torque is further applied to the joint.

The robot control apparatus may be configured so that the torque calculator calculates the first torque by performing the integral operation on the positional deviation multiplied by a transposed Jacobian matrix. That is, the first torque can be calculated by performing the integral operation on the value acquired from the kinematic operation of multiplying the positional deviation by the transposed Jacobian matrix. Note that, as described above, according to the invention, the end effector can be reliably moved to the target position even if there is an error in the kinematic operation. Thus, even if the transposed Jacobian matrix is uncertain and there is an error in the kinematic operation of acquiring the first torque, the end effector can be reliably moved to the target position. Thus, it is not particularly necessary to highly accurately carry out calibration to precisely acquire the transposed Jacobian matrix and loads of calibration can be reduced.

The robot control apparatus, controlling the robot in which the end effector is attached to one end of an arm having six or more degrees of freedom by coupling the joints, may be configured so that the imager images the reference position while capturing the destination of each of three or more of the reference positions that are set for the robot and include at least two positions set on the end effector side from a tip joint closest to one end side out of the joints in the field of view; the positional deviation acquirer acquires the positional deviation for each reference position; the application amount calculator calculates the first application amount and the second application amount for each joint; and the drive controller controls the location and posture of the end effector in a three dimensions by applying the first application amount and second application amount to the joints to move the three or more reference positions toward the destinations thereof.

In the thus configured invention, the position of the end effector is controlled by moving the three or more of the reference positions that are set for the robot and include at least two positions set on the end effector side from a tip joint toward the destinations thereof. Specifically, the reference positions are imaged in a state where the destination of each reference position is captured in the field of view, and the displacement amounts of the joints are detected. Based on these results, the application amounts that are forces or torques applied to the joints to displace the joints are calculated. That is, the first application amount based on the positional deviation from the destination acquired for each reference position is calculated from the imaging result, and the second application amount based on the displacement amount deviation between the target displacement amount and the detected displacement amount of the joint is calculated. Then, these first and second application amounts are superimposed and applied to the joint. In such a configuration, even if the positional deviation of the reference position cannot be acquired from the imaging result, the displacement amount of the joint can be detected, therefore, the joint is displaced by the second application amount based on the displacement amount deviation to bring the reference position closer to the destination, as a result, the end effector can be moved to the target position.

However, as described above, in the configuration where the application amount based on the positional deviation and application amount based on the displacement amount deviation of the joint are superimposed and applied to the joint, the application amount based on the positional deviation may act in a direction opposite to the application amount based on the displacement amount deviation to stop the displacement of the joint unless a kinematic operation is certain. In this case, the end effector stops with the positional deviation left. Similarly to this, in the configuration where the first application amount based on the positional deviation between the reference position and the destination and the second application amount based on the displacement amount deviation are superimposed and applied to the joint, the joint may stop with the positional deviation left and the end effector may stop at a position deviated from the target position since the kinematic operation is uncertain.

Contrary to this, in the invention, the first application amount to be applied to the joint while being superimposed with the second application amount is acquired by performing the integral operation on the value corresponding to the positional deviation of the reference position. Thus, if the joint stops or is about to stop before the reference position reaches the destination, the positional deviation remains, therefore, the first application amount increases with time to move the joint that has stopped or is about to stop. This first application amount keeps the joint moving to move the reference position to the destination until the positional deviation is finally eliminated. As a result, the end effector can be moved to the target position. Thus, in the invention, the end effector can be reliably moved to the target position by the function of the first application amount even if there is an error in the kinematic operation. As a result, highly accurate calibration is not required and loads of calibration can be reduced.

Particularly, this invention controls the position of the end effector by moving the three or more of the reference positions that are set for the robot and include at least two positions set for the end effector toward the destinations thereof. As a result, it is possible to properly control the end effector to the target location and posture in the three dimensions.

In the configuration to move three or more reference positions to the destinations thereof, there may occur a problem of being difficult to converge all the reference positions to the destinations thereof depending on a positional relationship between set positions of the reference positions and the destinations. Particularly, such a problem is likely to occur in setting all the reference positions on the end effector side from the tip joint.

Then, the robot control apparatus may be configured so that the drive controller moves each of the three or more reference positions including the reference position set as a specific reference position on the tip joint or on the other end side opposite to the one end side from the tip joint toward the corresponding destination. As just described, it becomes easier to converge all the reference positions to the destinations thereof by providing some reference position(s) (specific reference position) on the tip joint or on the other side from the tip joint.

Further, the robot control apparatus may be configured so that the specific reference position is set on a specific joint or on the other end side from the specific joint at which the total count is equal to or more than three when counting the degree of freedom of the joint in order from the one end side out of the plurality of the joint. In such a configuration, the specific reference position can be properly converged to the destination with the degrees of freedom on the other end side from the specific joint. The reference position set on the end effector side from the specific reference position can be properly converged to the destination with three or more degrees of freedom on the specific joint and on the one end side from the specific joint. That is, it is possible to execute a control using different degrees of freedom for the specific reference position and for the other reference positions. As a result, each reference position can be easily properly moved to the destination.

On this occasion, the robot control apparatus may be configured so that the specific reference position is set on the one end side from the joint at which the total count is equal to or more than three when counting the degree of freedom of the joint in order from the other end out of the plurality of the joint. In this way, the specific reference position can be more reliably converged to the destination with three or more degrees of freedom.

The robot control apparatus may be configured so that the application amount calculator calculates the first application amount by performing weighted addition, in which a weight coefficient of the value of integral for the specific reference position is larger than weight coefficients of the values of integral for the reference positions set on the end effector side from the tip joint, on the value of integral of each reference position. In such a configuration, it is possible to perform an operation of converging the reference positions set on the end effector side from the tip joint to the destinations after the specific reference position corresponding to a larger weight coefficient is quickly converged to the destination. Thus, the degrees of freedom on the specific joint and on the one end side from the specific joint, i.e. the degrees of freedom on the end effector side from the specific reference position can be substantially used only to move the reference positions set for the end effector. Thus, the reference positions set for the end effector can be reliably converged to the destinations with sufficient degrees of freedom.

On this occasion, the robot control apparatus may be configured so that the application amount calculator calculates a third application amount from a result of acquiring a proportional value, which is acquired by performing a proportional operation on the value corresponding to the positional deviation, for each reference position and the drive controller further applies the third application amount to the joints.

The robot control apparatus may be configured so that the application amount calculator calculates the first application amount by acquiring the value of integral by performing an integral operation on the positional deviation multiplied by a transposed Jacobian matrix. That is, the first application amount can be calculated by performing the integral operation on the value acquired from the kinematic operation of multiplying the positional deviation by the transposed Jacobian matrix. Note that, as described above, according to the invention, the end effector can be reliably moved to the target position even if there is an error in the kinematic operation. Thus, even if the transposed Jacobian matrix is uncertain and there is an error in the kinematic operation of acquiring the first application amount, the end effector can be reliably moved to the target position. Therefore, it is not particularly necessary to highly accurately carry out calibration to precisely acquire the transposed Jacobian matrix and loads of calibration can be reduced.

Effect of the Invention

Even if there is an error in a kinematic operation, an end effector can be moved to a target position and loads of calibration can be reduced.

BRIEF DESCRIPTION OF DRAWINGS

FIG. 2 is a block diagram showing an electrical configuration for executing the position control of the end effector 4 in the robot system of FIG. 1.

FIG. 6 is a graph showing experimental results in Example 1.

DESCRIPTION OF EMBODIMENTS

First Embodiment

Figure 1:
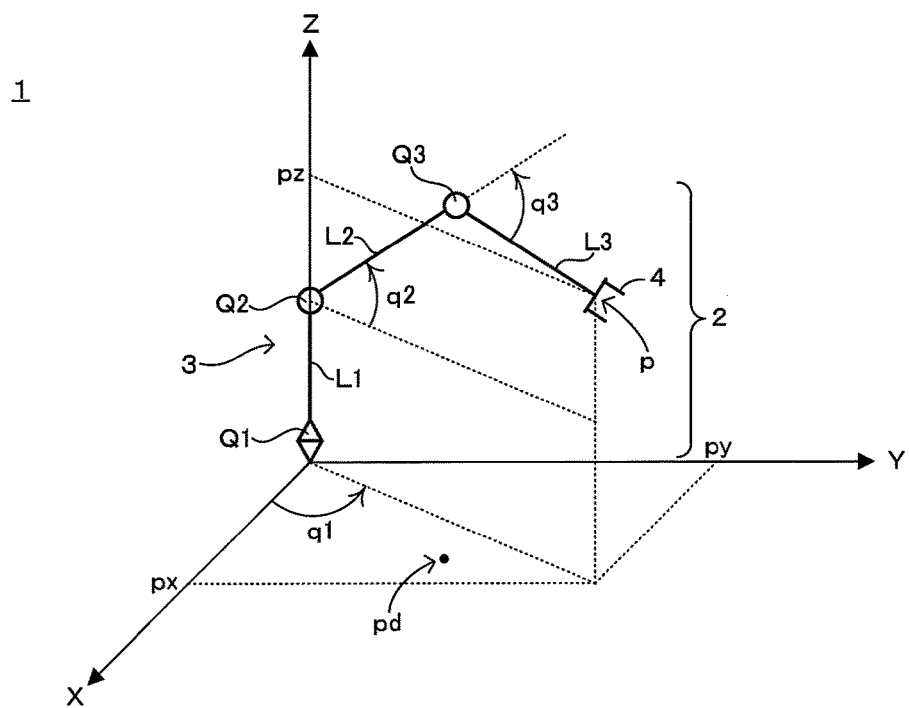
FIG. 1 is a diagram showing an example of a robot system according to a first embodiment of the invention.
Figure 1:
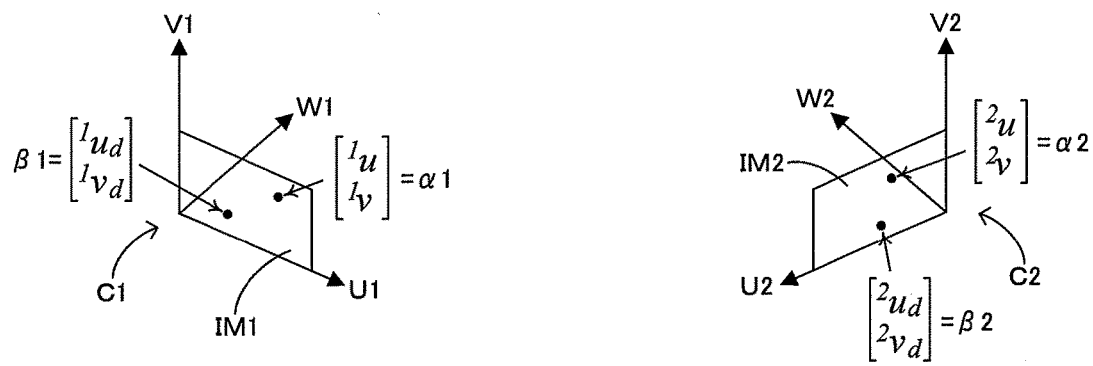

FIG. 1 is a diagram showing an example of a robot system according to a first embodiment of the invention. As shown in FIG. 1, the robot system 1 includes a robot 2 and two cameras C1, C2. Note that, in FIG. 1, the robot 2 is schematically shown by symbol notation of joints Q1 to Q3, links L1 to L3 and an end effector 4 and the cameras C1, C2 are schematically shown by being represented by image planes IM1, IM2 thereof.

The robot 2 has such a schematic configuration that the end effector 4 (tool) is attached to the tip of an arm 3 which includes freely rotatable joints Q1 to Q3 and moves according to the rotation of the joints Q1 to Q3. Specifically, the arm 3 is formed by attaching the link L1 between the joints Q1, Q2, attaching the link L2 between the joints Q2, Q3 and attaching one end of the link L3 to the joint Q3. The end effector 4 is attached to the other end of the link L3 (tip of the arm 3). The joint Q1 rotates around a vertical axis, thereby rotating the members on the side of the end effector 4 around the vertical axis. The joint Q2 rotates to change angles between the link L1 and the members on the side of the end effector 4. The joint Q3 rotates to change angles between the members on the side of the end effector 4 and the link L2.

In the thus configured robot 2, the end effector 4 can be moved by changing rotation angles q1 to q3 of the joints Q1 to Q3. Particularly, this robot system 1 controls a position p of the end effector 4 by adjusting the rotation angles q1 to q3 of the joints Q1 to Q3 based on detection results of the position p of the end effector 4 (specifically, representative point such as a TCP (Tool Center Point)) by the cameras C1, C2. On this occasion, a mark such as an LED (Light Emitting Diode) may be attached to the representative point to improve visibility in the cameras C1, C2.

That is, the cameras C1, C2 are respectively positioned to include a target position pd as a destination of the end effector 4 in a field of view thereof, and a positional deviation Δp between the position p of the end effector 4 and the target position pd is captured in mutually different planes. Specifically, the cameras C1, C2 are, for example, so arranged that the image planes IM1, IM2 are perpendicular to each other, a YZ plane of a task coordinate system is imaged by the camera C1 and a ZX plane of the task coordinate system is imaged by the camera C2. The position control of the end effector 4 is executed by adjusting the rotation angles q1 to q3 of the joints Q1 to Q3 to reduce the positional deviation Δp between the target position pd and the position p of the end effector 4 detected by imaging results of the cameras C1, C2 (visual feedback).

On this occasion, it may be configured so that an imaging result of the robot 2 at a singular point is not fed back to the position control of the end effector 4. In a specific example, the cameras C1, C2 may be so arranged that the robot 2 at the singular point is outside the fields of view of the cameras C1, C2. In this way, it can be suppressed that the visual feedback is performed based on the imaging result of the robot 2 at the singular point and the control of the robot 2 becomes unstable.

Here, the notation of coordinate systems and each control amount used in the position control of the end effector 4 is described. As shown in FIG. 1, the three-dimensional task coordinate system configured by X, Y and Z axes perpendicular to each other with the Z axis as a vertical axis is defined for a task space where the end effector 4 operates. Thus, the position p of the end effector 4 is given by a three-dimensional vector (px, py, pz). Similarly, the target position pd of the end effector 4 is also given by a three-dimensional vector (pdx, pdy, pdz).

A three-dimensional camera coordinate system configured by Ui, Vi and Zi axes perpendicular to each other is defined for each camera Ci. Here, "i" is a number for distinguishing the camera (i=1, 2), the Ui axis is a horizontal axis of the $i^{th}$ camera Ci, the Vi axis is a vertical axis of the $i^{th}$ camera Ci and the Wi axis is a depth axis of the $i^{th}$ camera Ci. Further, in FIG. 1, image planes IMi of the cameras Ci in UiVi planes are shown and coordinates αi as projection of the position p (reference point) on the image planes IMi (i.e. coordinates αi of the position p in the coordinate systems of the cameras Ci) and coordinates βi as projection of the target position pd (destination) on the image planes IMi (i.e. coordinates βi of the target position pd in the coordinate systems of the cameras Ci) are shown. These coordinates αi, βi are specifically as follows.

$$\begin{bmatrix} {}^i u \\ {}^i v \end{bmatrix} : \text{COORDINATE } \alpha i \text{ AS PROJECTION OF}$$

REFERENCE POINT $p$ ON IMAGE PLANE $IMi$ $$\begin{bmatrix} {}^i u_d \\ {}^i v_d \end{bmatrix} : \text{COORDINATE } \beta i \text{ AS PROJECTION OF}$$

DESTINATION $pd$ ON IMAGE PLANE $IMi$

[Equation 1]

The rotation angles q of the joint Q of the robot 2 are expressed by a vector (q1, q2, q3) including the rotation angle qn of the joint Qn as each component. Here, the notation of joints Q is the collective notation of the joints Q1 to Q3 and "n" is a number for distinguishing the joint (n=1, 2, 3). Further, target angles qd (=qd1, qd2, qd3) are the rotation angles q of the joints Q when the end effector 4 is at the target position pd. Furthermore, torques τ applied to the joints Q of the robot 2 are expressed by a vector (τ1, τ2, τ3) including a torque τn acting on the joint Qn as each component.

The above is description of the notation of the coordinate systems and the control amounts. Next, the position control of the end effector 4 is described in detail. FIG. 2 is a block diagram showing an electrical configuration for executing the position control of the end effector 4 in the robot system of FIG. 1. As shown in FIG. 2, the robot system 1 includes a controller 5 in charge of an arithmetic function and configured by a CPU (Central Processing Unit), a memory and the like. This controller 5 executes the position control of the end effector 4 in accordance with a program 7 recorded in a recording medium 6. Note that various media such as CDs (Compact Discs), DVDs (Digital Versatile Discs), USB (Universal Serial Bus) memories can be used as the recording medium 6. Further, in the robot system 1, a motor Mn for driving the joint Qn is provided for each of the joints Q1 to Q3, and an encoder En for detecting a rotational position of the motor Mn is provided for each of the motors M1 to M3.

The controller 5 adjusts the rotation angles q of the joints Q of the robot 2 by controlling each of the motors M1 to M3. On this occasion, to perform the aforementioned visual feedback, the controller 5 detects the positional deviation Δp (=pd−p) of the end effector 4 from the imaging results of the end effector 4 by the cameras Ci (external sensors). On this occasion, the controller 5 detects the positional deviation Δp of the end effector 4 while controlling panning/tiling of the cameras Ci so that the target position pd coincides with or is proximate to origins of the coordinate systems of the cameras Ci (centers of the image planes IMi).

Further, in parallel with the detection of the positional deviation Δp of the end effector 4, the controller 5 detects angular deviations Δq (=qd−q) of the joints Q from outputs of the encoders E1 to E3 (internal sensors). Then, the controller 5 calculates the torques τ based on the positional deviation Δp (=pd−p) and the angular deviations Δq (qd−q). Then, the motors M1 to M3 apply the torques τ to the joints Q, thereby adjusting the rotation angles q of the joints Q. As just described, the detection results of the cameras Ci and the encoders En are fed back to the torques τ to control the position of the end effector 4 in this embodiment.

Figure 3:
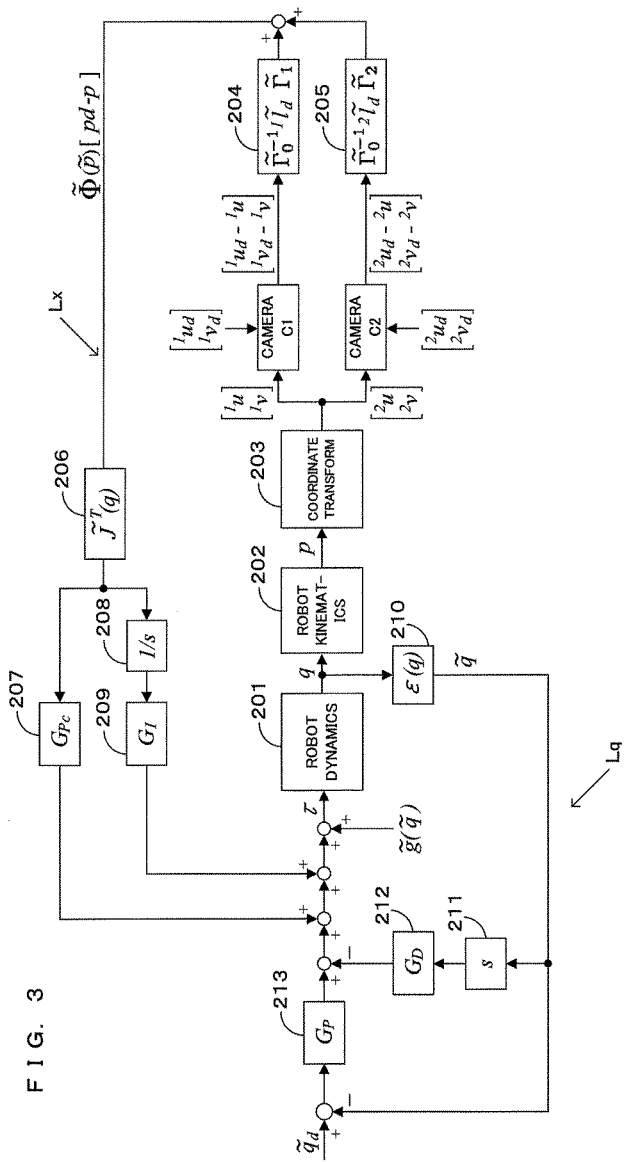
FIG. 3 is a block diagram showing an example of the position control of the end effector executed in the robot system.

FIG. 3 is a block diagram showing an example of the position control of the end effector executed in the robot system. In FIG. 3 and the following description, a symbol "~" indicates that a quantity with this symbol possibly includes an error, a matrix with a symbol "T" on an upper right corner indicates a transposed matrix of the matrix to which the symbol "T" is attached, a matrix with a symbol "−1" on an upper right corner indicates an inverse matrix of the matrix to which the symbol "−1" is attached, a symbol "s" is a variable of Laplace transform (Laplace variable) and a symbol "." indicates a derivative. Further, in FIG. 3 and the following equations, a symbol "d" attached to the target position pd and the target angles qd and the like are written as a subscript as appropriate.

When the torques τ are applied to the joints Q of the robot 2, the robot 2 moves in accordance with robot dynamics 201 and the joints Q of the robot 2 have the rotation angles q. Here, the robot dynamics 201 specify a relationship between torques acting on the mechanism of the robot 2 and acceleration created by these torques. As a result, the end effector 4 moves to the position p corresponding to the rotation angles q in accordance with robot kinematics 202. Further, to execute the aforementioned feedback control, the controller 5 has an external loop Lx to feed the positional deviation Δp back to the torques τ and an internal loop Lq to feed the angular deviations Δq back to the torques τ.

In the external loop Lx, the position p of the end effector 4 is detected by two cameras C1, C2. In other words, the position p of the end effector 4 in the task coordinate system is transformed into coordinates α1, α2 of the coordinate systems of the respective cameras C1, C2 by coordinate transform 203. Then, the cameras C1, C2 output values (β1−α1), (β2−α2) indicating the positional deviation Δp in the respective coordinate systems. Specifically, the value (βi−αi) indicating the positional deviation Δp in the coordinate system of the camera Ci is as follows.

$$\begin{bmatrix} {}^iu_d - {}^iu \\ {}^iv_d - {}^iv \end{bmatrix}: \text{VALUE } (\alpha i - \beta i) \text{ INDICATING} \qquad [\text{Equation 2}]$$

POSITIONAL DEVIATION $\Delta p$ IN

COORDINATE SYSTEM OF CAMERA $Ci$

Then, the torques $\tau$ based on the positional deviation $\Delta p$ in the task coordinate system are calculated from the positional deviations ($\beta i - \alpha i$) expressed in the coordinate systems of the respective cameras C1, C2. In this calculation of the torques $\tau$, a relationship established between the positional deviations in the camera coordinate systems and that in the position coordinate system can be used.

That is, the following relationship is established between the coordinate systems of the cameras Ci and the task coordinate system.

$${}^il\begin{bmatrix} {}^iu \\ {}^iv \\ 1 \end{bmatrix} = {}^iA[{}^iR^T - {}^iR^T{}^i\eta]\begin{bmatrix} px \\ py \\ pz \\ 1 \end{bmatrix} = {}^iP\begin{bmatrix} px \\ py \\ pz \\ 1 \end{bmatrix} \qquad [\text{Equation 3}]$$

${}^il$: DISTANCE BETWEEN IMAGE PLANE $IMi$

AND POSITION $p$ IN DEPTH-AXIS DIRECTION

OF $i^{th}$ CAMERA $Ci$ (DEPTH DISTANCE)

${}^iA$: 3×3 ROTATION MATRIX EXPRESSION

INTERNAL PARAMETER A OF $i^{th}$ CAMERA $Ci$ ${}^iR$: 3×3 ROTATION MATRIX TRANSFORMATION

COORDINATE FROM COORDINATE SYSTEM OF $i^{th}$ CAMERA $Ci$ TO TASK COORDINATE SYSTEM $\eta$: VECTOR FROM ORIGIN OF COORDINATE SYSTEM OF $i^{th}$ CAMERA $Ci$ TO ORIGIN

OF TASK COORDINATE SYSTEM $${}^iP = \begin{bmatrix} {}^iP_{11} & {}^iP_{12} & {}^iP_{13} & {}^iP_{14} \\ {}^iP_{21} & {}^iP_{22} & {}^iP_{23} & {}^iP_{24} \\ {}^iP_{31} & {}^iP_{32} & {}^iP_{33} & {}^iP_{34} \end{bmatrix}: \text{PERSPECTIVE}$$

PROJECTION MATRIX OF $i^{th}$ CAMERA $Ci$

Note that a matrix expressing an internal parameter A of the camera is specifically given by the following equation.

$$A = \begin{bmatrix} fk_u & fk_u\cot\phi & u_0 \\ 0 & fk_v/\sin\phi & v_0 \\ 0 & 0 & 1 \end{bmatrix} \qquad [\text{Equation 4}]$$

f: FOCAL LENGTH OF CAMERA $k_u$: SCALE IN HORIZONTAL-AXIS DIRECTION OF CAMERA $k_v$: SCALE IN VERTICAL-AXIS DIRECTION OF CAMERA $\phi$: ANGLE BETWEEN HORIZONTAL-AXIS DIRECTION AND VERTICAL-AXIS DIRECTION OF CAMERA $u_0$: HORIZONTAL COMPONENT AT POINT WHERE OPTICAL AXIS INTERSECT WITH IMAGE PLANE $v_0$: VERTICAL COMPONENT AT POINT WHERE OPTICAL AXIS INTERSECT WITH IMAGE PLANE Since the relationship of Equation 3 is established, the following relationship is established between the positional deviations ($\beta i - \alpha i$) in the camera coordinate systems and the positional deviation (pd−p) in the task coordinate system.

$$\begin{bmatrix} {}^iu_d - {}^iu \\ {}^iv_d - {}^iv \\ 0 \end{bmatrix} = \frac{1}{{}^il_d}{}^iP\begin{bmatrix} pdx \\ pdy \\ pdy \\ 1 \end{bmatrix} - \frac{1}{{}^il}{}^iP\begin{bmatrix} px \\ py \\ pz \\ 1 \end{bmatrix} \qquad [\text{Equation 5}]$$

$$= \frac{1}{{}^il_d}{}^iA{}^iR^T\begin{bmatrix} \Delta px \\ \Delta py \\ \Delta pz \end{bmatrix} + \left(\frac{1}{{}^il_d} - \frac{1}{{}^il}\right){}^iP\begin{bmatrix} px \\ py \\ pz \\ 1 \end{bmatrix}$$

$$= \frac{1}{{}^il_d}{}^iA{}^iR^T\begin{bmatrix} \Delta px \\ \Delta py \\ \Delta pz \end{bmatrix} + \left(\frac{{}^il - {}^il_d}{{}^il_d}\right)\begin{bmatrix} {}^iu \\ {}^iv \\ 0 \end{bmatrix}$$

${}^il_d$: DISTANCE BETWEEN IMAGE PLANE IMi AND DESTINATION pd IN DEPTH-AXIS DIRECTION OF $i^{th}$ CAMERA Ci (DEPTH DISTANCE)

Further, the following relationship is also established.

$${}^il - {}^il_d = [0\ 0\ 1]\left\{{}^iP\begin{bmatrix} pdx \\ pdy \\ pdy \\ 1 \end{bmatrix} - {}^iP\begin{bmatrix} px \\ py \\ pz \\ 1 \end{bmatrix}\right\} \qquad [\text{Equation 6}]$$

$$= [0\ 0\ 1]{}^iA{}^iR^T\begin{bmatrix} \Delta px \\ \Delta py \\ \Delta pz \end{bmatrix}$$

$$= {}^iP_{31}\Delta px + {}^iP_{32}\Delta py + {}^iP_{33}\Delta pz$$

Then, the following equation is obtained from Equations 5 and 6.

$$\begin{bmatrix} {}^iu_d - {}^iu \\ {}^iv_d - {}^iv \\ 0 \end{bmatrix} = \frac{1}{{}^il_d}[{}^iA{}^iR^T - {}^i\Lambda]\begin{bmatrix} \Delta px \\ \Delta py \\ \Delta pz \end{bmatrix} \qquad [\text{Equation 7}]$$

$${}^i\Lambda = \begin{bmatrix} {}^iP_{31}{}^iu & {}^iP_{32}{}^iu & {}^iP_{33}{}^iu \\ {}^iP_{31}{}^iv & {}^iP_{32}{}^iv & {}^iP_{33}{}^iv \\ {}^iP_{31} & {}^iP_{32} & {}^iP_{33} \end{bmatrix}$$

Here, a coefficient matrix $\Gamma i$ relating the positional deviations ($\beta i - \alpha i$) expressed in the camera coordinate systems and the positional deviation (pd−p) expressed in the task coordinate system is defined by the following equation.

$$\Gamma_1 = [{}^1\tilde{A}{}^1\tilde{R}^T]^{-1}l_0^1\tilde{E}^{-1} \qquad [\text{Equation 8}]$$

$$\Gamma_2 = [{}^2\tilde{A}{}^2\tilde{R}^T]^{-1}l_0^2\tilde{E}^{-1}$$

-continued $$I_0 = \begin{bmatrix} 1 & 0 \\ 0 & 1 \\ 0 & 0 \end{bmatrix}$$

$^i E$: 2×2 MATRIX EXPRESSING LENS DISTORTION E OF $i^{th}$ CAMERA Ci

Note that a matrix expressing a lens distortion E of the camera specifically satisfies the following equation.

$$\begin{bmatrix} {}^i u_{dt} - {}^i u_t \\ {}^i v_{dt} - {}^i v_t \end{bmatrix} = {}^i E \begin{bmatrix} {}^i u_d - {}^i u \\ {}^i v_d - {}^i v \end{bmatrix} \quad \text{[Equation 9]}$$

$\begin{bmatrix} {}^i u_{dt} - {}^i u_t \\ {}^i v_{dt} - {}^i v_t \end{bmatrix}$: VALUE EXPRESSING POSITION DEVIATION $\Delta p$ WHERE EFFECT OF LENS DISTORTION IS ELIMINATED WITH COORDINATE SYSTEM OF CAMERA $Ci$ The following equation relating the positional deviations ($\beta i$-$\alpha i$) expressed in the camera coordinate systems of the two cameras C1, C2 and the positional deviation (pd-p) expressed in the task coordinate system is obtained from Equations 7 and 8.

$$
{}^1\tilde{l}_d\Gamma_1\begin{bmatrix} {}^1 u_d - {}^1 u \\ {}^1 v_d - {}^1 v \end{bmatrix} + {}^2\tilde{l}_d\Gamma_2\begin{bmatrix} {}^2 u_d - {}^2 u \\ {}^2 v_d - {}^2 v \end{bmatrix} = \begin{bmatrix} {}^1\tilde{l}_d \\ {}^1 l_d \end{bmatrix}[{}^1\tilde{A}^1\tilde{R}^T]^{-1} \quad \text{[Equation 10]}
$$

$$
I_0 \tilde{E}^{-11} E I_o^T [{}^1 A^1 R^T - {}^1 \Lambda] +
$$

$$
\frac{2\tilde{l}_d}{{}^2 l_d}[{}^2\tilde{A}^2\tilde{R}^T]^{-1} I_0^1 \tilde{E}^{-12} E I_o^T[{}^2 A^2 R^T - {}^2 \Lambda]\bigg][pd - p]
$$

$^i \tilde{l}_d$: ESTIMATE OF DEPTH DISTANCE $^i l_d$ TO DESTINATION pd

Note that an estimate of a depth distance to the target position pd is used in Equation 10. This estimate can be an appropriate constant. Specifically, if the task coordinate system and the coordinate system of the camera Ci is sufficient distant, a distance between the origins of these coordinate systems may be set as this estimate. Alternatively, both the camera C1 and the target position pd may be captured in the field of view of the camera C2, the estimate of the camera C1 may be obtained from the imaging result of the camera C2 and the estimate of the camera C2 may be also similarly obtained from the imaging result of the camera C1.

Further, a correction matrix is defined by the following equation.

$$\Gamma_0 = [{}^1\tilde{A}^1\tilde{R}^T]^{-1} I_0 I_0^T [{}^1\tilde{A}^1\tilde{R}^T - {}^1\tilde{\Lambda}] + \quad \text{[Equation 11]}$$

$$[{}^2\tilde{A}^2\tilde{R}^T]^{-1} I_0 I_0^T [{}^2\tilde{A}^2\tilde{R}^T - {}^2\tilde{\Lambda}].$$

$\Gamma_0$: CORRECTION MATRIX

An inverse matrix of this correction matrix has a function of normalizing a coefficient multiplied to the positional deviation (pd-p) on the right side of Equation 10. Accordingly, the product of the inverse matrix of the correction matrix and this coefficient is equal to an identity matrix.

However, since each parameter has an error, this product includes, strictly speaking, a component corresponding to the position p and is expressed as follows using a matrix $\Phi(p)$. Here, $\Phi(p)$ is a matrix having a component corresponding to the position p and substantially equal to the identity matrix.

$$
\Gamma_0^{-1}\bigg[\frac{{}^1\tilde{l}_d}{{}^1 l_d}[{}^1\tilde{A}^1\tilde{R}^T]^{-1} I_0^1 \tilde{E}^{-11} E I_o^T [{}^1 A^1 R^T - {}^1 \Lambda] + \quad \text{[Equation 12]}
$$

$$
\frac{2\tilde{l}_d}{{}^2 l_d}[{}^2\tilde{A}^2\tilde{R}^T]^{-1} I_0^1 \tilde{E}^{-12} E I_o^T [{}^2 A^2 R^T - {}^2 \Lambda]\bigg] = \Phi(p)
$$

As a result, the following relationship is obtained from the relationships of Equations 10 and 12.

$$
\Gamma_0^{-11}\tilde{l}_d\Gamma_1\begin{bmatrix} {}^1 u_d - {}^1 u \\ {}^1 v_d - {}^1 v \end{bmatrix} + \Gamma_0^{-11}\tilde{l}_d\Gamma_2\begin{bmatrix} {}^2 u_d - {}^2 u \\ {}^2 v_d - {}^2 v \end{bmatrix} = \Phi(p)[pd - p] \quad \text{[Equation 13]}
$$

As just described, a positional deviation detection amount (=$\Phi(p)(pd-p)$) corresponding to the positional deviation (pd-p) expressed in the task coordinate system can be obtained from the positional deviations ($\beta 1$-$\alpha 1$), ($\beta 2$-$\alpha 2$) expressed in the respective coordinate systems of the two cameras C1, C2. Accordingly, in the external loop Lx, values obtained by applying operations 204, 205 respectively to the positional deviations ($\beta 1$-$\alpha 1$), ($\beta 2$-$\alpha 2$) in the coordinate systems of the cameras C1, C2 are added to calculate the positional deviation detection amount (=$\Phi(p)(pd-p)$) in the task coordinate system as shown in FIG. 3.

Note that, as described later, this embodiment has an advantage of being able to precisely move the end effector 4 to the target position pd without requiring highly accurate calibration. Thus, the correction matrix and the coefficient matrix may include an error in the operations 204, 205. Corresponding to this, the symbol "~" is attached to these in the block diagram of FIG. 3.

An operation 206 is performed to multiply the positional deviation detection amount by a transposed Jacobian matrix (transposed matrix of a Jacobian matrix) in the controller 5. Further, a proportional operation and an integral operation are performed on the positional deviation detection amount multiplied by the transposed Jacobin matrix in the controller 5. Specifically, the proportional operation is performed to multiply the positional deviation detection amount multiplied by the transposed Jacobian matrix by a proportional gain (operation 207). Further, the integral operation by time is performed on the positional deviation detection amount multiplied by the transposed Jacobian matrix (operation 208). Furthermore, an integral operation value is multiplied by an integral gain (operation 209). Then, the results of these operations 207, 209 are fed back to an input side of the robot dynamics 201 (i.e. torques τ). The above is the operation of the external loop Lx.

In the internal loop Lq, angle detection 210 is performed to detect the rotation angle q of the joint Q. Note that the rotation angle q detected by this angle detection possibly includes an error. Corresponding to this, in the angle detection 210 of FIG. 3, a detection value of the rotation angle q is expressed as an output value of an error function c(q). This error function can be expressed by a linear function of (a true value of) the rotation angle q such as $\epsilon(q)=c1\times q+c2$. Further, in the internal loop Lq, a derivative operation and a proportional operation are performed on the detected value ε(q) of the rotation angle q. Specifically, the derivative operation by time is performed on the detected value ε(q) (operation 211). Further, the derivative operation value is multiplied by a derivative gain (operation 212). Furthermore, the proportional operation 213 is performed to multiply the deviation Δq from the target angle qd by a proportional gain. The results of these operations are fed back to the input side of the robot dynamics 201 (i.e. torques τ). The above is the operation of the internal loop Lq.

The controller 5 determines the torques τ by adding a gravitational force compensation term g(q) to the operation results of these external and internal loops Lx, Lq. Here, the gravitational force compensation term g(q) is equivalent to a torque necessary to make the robot 2 stationary against a gravitational force. As a result, the torques τ to be applied to the joints Q are given by the following equation.

$$\tau = \tilde{g}(\tilde{q}_d) + G_P(\tilde{q}_d - \tilde{q}) - G_D\dot{\tilde{q}} + \\ G_{Pc}\tilde{J}^T(\tilde{q})\tilde{\Phi}(\tilde{p})[pd - p] + G_I \int_{t_0}^{t} \tilde{J}^T(\tilde{q})\tilde{\Phi}(\tilde{p})[pd - p]d\delta$$

[Equation 14]

$G_P$: PROPORTIONAL GAIN FOR ANGULAR DEVIATION Δq
$G_D$: DERIVATIVE GAIN FOR ANGLE q
$G_{Pc}$: PROPORTIONAL GAIN FOR POSITIONAL DEVIATION Δp
$G_I$: INTEGRAL GAIN FOR POSITIONAL DEVIATION Δp
$\tilde{J}^T$: MATRIX CONTAINING OF ESTIMATE OF TRANSPOSED JACOBIAN MATRIX (TRANSPOSED MATRIX OF JACOBIAN MATRIX)
t: TIME
to: CONTROL START TIME In Equation 14, the first term is the gravitational force compensation term, the second term is a term for executing a proportional control on the angular deviations Δq, the third term is a term for executing a derivative control on the rotation angles q, the fourth term is a term for executing a proportional control on the positional deviation Δp, and the fifth term is a term for executing an integral control on the positional deviation Δp. Note that although an integral interval is a time from a control start time $t_0$ in Equation 14, the integral interval is not limited to this and can be appropriately changed. A specific example is as follows. If the end effector 4 starts moving from a position outside the fields of view of the cameras C1, C2, a time at which the end effector 4 enters the fields of view of the both cameras C1, C2 and the visual feedback starts properly functioning may be set as a starting point of the integral interval.

As described above, in this embodiment, the end effector 4 is imaged while the target position pd of the end effector 4 is included in the fields of view, and the rotation angles q of the joints Q are detected (first step). Then, the torques based on the positional deviation Δp of the end effector 4 (torques given by the fifth term of Equation 14) are calculated based on the imaging results and the torques based on the angular deviations Δq of the joints Q (torques given by the second term of Equation 14) are calculated (second step). Then, the motors M1 to M3 are controlled to apply these torques to the joints Q (third step). In this way, these torques are superimposed and applied to the joints Q. In such a configuration, the rotation angles q of the joints Q can be detected even if the positional deviation Δp of the end effector 4 cannot be obtained from the imaging results. Thus, the end effector 4 is brought closer to the target position pd by rotating the joints Q by the torques based on the angular deviations Δq. However, in a configuration where the torques based on the angular deviations Δq and the torques based on the positional deviation Δp are superimposed and applied to the joints Q, if there is an error in a kinematic operation, the rotation of the joints Q may stop before the end effector 4 reaches the target position pd and the end effector 4 may stop at a position deviated from the target position pd.

Contrary to this, in this embodiment, the torque based on the positional deviation Δp to be applied to the joints Q while being superimposed with the torques based on the angular deviations Δq is a positional deviation integral torque obtained by performing the integral operation on the value corresponding to the positional deviation Δp. Thus, if the rotation of the joints Q stops or is about to stop before the end effector 4 reaches the target position pd because of an error in the kinematic operation, the positional deviation integral torque increases with time to rotate the joints Q that have stopped or are about to stop. Then, this positional deviation integral torque keeps the joints Q rotating to move the end effector 4 to the target position pd until the positional deviation is finally eliminated. Thus, in this embodiment, even if there is an error in the kinematic operation, the end effector 4 can be reliably moved to the target position pd by the function of the positional deviation integral torque. As a result, highly accurate calibration is not required and loads of calibration can be reduced.

Particularly, in this embodiment, the positional deviation integral torque is calculated by the kinematic operation of performing the integral operation on the positional deviation Δp multiplied by the transposed Jacobian matrix. Contrary to this, according to this embodiment, the end effector 4 can be reliably moved to the target position pd even if there is an error in the kinematic operation. Thus, even if the transposed Jacobian matrix is uncertain and there is an error in the kinematic operation of obtaining the positional deviation integral torque, the end effector 4 can be reliably moved to the target position pd. Therefore, it is not particularly necessary to highly accurately carry out calibration to precisely obtain the transposed Jacobian matrix and loads of calibration can be reduced.

The above technical content may be understood as follows. That is, in the configuration where the torques based on the angular deviations Δq and torques based on the positional deviation Δp are superimposed and applied to the joints Q, the both torques are balanced out to stop the rotation of the joints Q if there is an error in the kinematic operation. This is thought to be because a potential distribution in the task space has a minimum value at a position different from the target position pd and the end effector 4 falls to this minimum value if there is an error in the kinematic operation. Contrary to this, in the case of applying the above positional deviation integral torque to the joints Q, the end effector 4 can be moved to the target position pd by the action of the positional deviation integral torque that increases with time. Thus, even in the case where the minimum value is located at a position different from the target position pd due to an error in the kinematic operation, the end effector 4 can be reliably moved to the target position pd. As a result, highly accurate calibration is not required and loads of calibration can be reduced.

According to this embodiment, if the end effector 4 has the positional deviation Δp, the positional deviation integral torque acts on the joints Q and the end effector 4 can be moved to the target position pd. In the above description, an error in the kinematic operation is cited as a cause of this positional deviation Δp. However, in this embodiment, regardless of a cause of the positional deviation Δp of the end effector 4, the end effector 4 is moved to the target position pd to eliminate the positional deviation Δp if there is any positional deviation Δp. That is, positional deviations Δp due to the uncertainty of the term for gravitational force compensation and the values of the target angles qd, detected rotation angles q or the like can be eliminated by the action of the positional deviation integral torque. Thus, only if the positional deviation (Δp=pd−p) of the end effector 4 is obtained, it is possible to move the end effector 4 to the target position pd. As a result, there are few parameters required to be accurate, therefore loads of calibration are very light and calibration can be omitted in some cases.

As just described, in the first embodiment, the robot system 1 corresponds to an example of a "robot system" of the invention, the robot 2 corresponds to an example of a "robot" of the invention, the controller 5, the cameras Ci and the encoders En function in cooperation as an example of a "robot control apparatus" of the invention, the controller 5 corresponds to an example of a "computer" of the invention, the recording medium 6 corresponds to an example of a "recording medium" of the invention, the program 7 corresponds to an example of a "program" of the invention, the encoders En correspond to an example of an "angle detector" of the invention, the controller 5 functions as examples of a "torque calculator" and a "drive controller" of the invention, and the motors Mn correspond to an example of a "joint drive mechanism" of the invention. Further, in Equation 14, the torque given by the fifth term corresponds to an example of a "first application amount" or a "first torque" of the invention, the torque given by the second term corresponds to an example of a "second application amount" or a "second torque" of the invention and the torque given by the third term corresponds to an example of a "third application amount" or a "third torque" of the invention.

Note that the invention is not limited to the first embodiment described above and various changes other than the aforementioned ones can be made without departing from the gist of the invention. For example, in the above first embodiment, the mark attached to the end effector 4 is recognized as the position of the end effector 4. However, a characteristic part (e.g. tip, hole) of the end effector 4 or a characteristic part of a target (e.g. bolt) gripped by the end effector 4 may be recognized as the position of the end effector 4.

Further, a case where the end effector 4 is moved to one target position pd is described in the above first embodiment. However, in the case of moving the end effector 4 in consideration of the posture thereof, three representative points may be set for the end effector 4 and the three points may be moved to target positions thereof. Specifically, when positions of the three points set on the end effector 4 are denoted by x, y and z and the target positions thereof are denoted by zd, yd and zd, positional deviations of the three points are given by Δx(=xd−x), Δy(=yd−y) and Δz(=zd−z). A positional deviation integral torque similar to the above one may be calculated for each of the positional deviations Δx, Δy and Δz and applied to the joints Q.

Further, a control law expressed by Equation 14 can also be appropriately changed. In a specific example, a change to omit the first term for gravitational force compensation, the third term for executing the derivative control on the rotation angles q or the fourth term for executing the proportional control on the positional deviation Δp can be made.

Further, panning/tilting of the cameras Ci is controlled to bring the target position pd into coincidence with or proximity to the origins of the coordinate systems of the cameras Ci (centers of the image planes IMi). However, the coincidence of the target position pd and the origins of the coordinate systems of the cameras Ci is not always necessary.

Further, it is not necessary to constantly execute the above control to superimpose the external loop Lx and the internal loop Lq and feed them back to the torques. For example, if the end effector 4 is outside the fields of view of the cameras Ci, a feedback amount from the external loop Lx may be set at zero and the external loop Lx may not be performed. After the end effector 4 enters the fields of view of the cameras Ci, the external loop may be performed.

On this occasion, an operation until the end effector 4 enters the fields of view of the cameras Ci may be taught to the robot 2. Such teaching suffices to be rough since it is sufficient to move the end effector 4 into the fields of view of the cameras Ci. However, it is, of course, all right to execute a control to track a trajectory of the end effector 4 until entry into the fields of view of the cameras Ci and locate the end effector 4 in the fields of view of the cameras Ci.

Alternatively, it is also possible not to perform the external loop Lx and to use only the internal loop Lq while the end effector 4 is outside a predetermined range from the target position pd even if the end effector Ci enters the fields of view of the cameras Ci. In this case, the external loop Lx may be performed after the end effector 3 enters the predetermined range from the target position pd. In such a configuration, the end effector 4 can be highly accurately positioned with the external loop Lx at a final stage of a movement to the target position pd.

Second Embodiment

Figure 4:
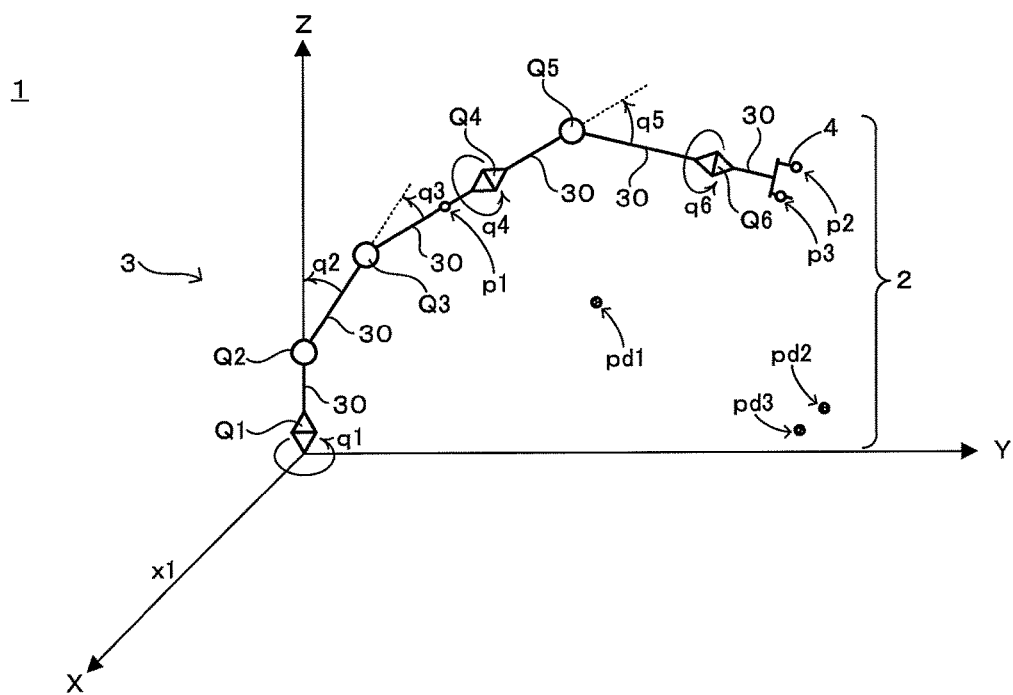
FIG. 4 is a diagram showing an example of a robot system according to a second embodiment of the invention.
Figure 4:
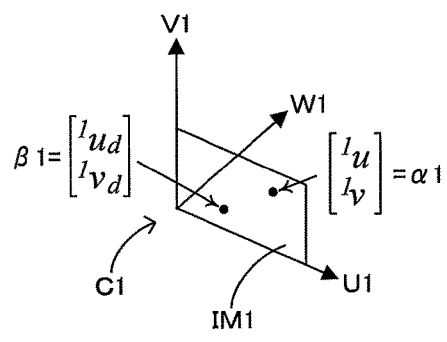
Figure 4:
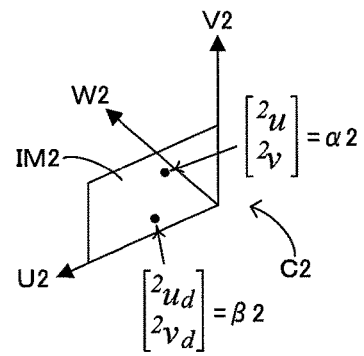

FIG. 4 is a diagram showing an example of a robot system according to a second embodiment of the invention. As shown in FIG. 4, the robot system 1 includes a robot 2 and two cameras C1, C2. Note that, in FIG. 1, the robot 2 is schematically shown by symbol notation of joints Q1 to Q6, links 30 and an end effector 4 and the cameras C1, C2 are schematically shown by being represented by image planes IM1, IM2 thereof.

The robot 2 has such a schematic configuration that the end effector 4 (tool) is attached to the tip of an arm 3 which includes freely rotatable joints Q1 to Q6 and moves according to the rotation of the joints Q1 to Q6. Specifically, the joints Q1 to Q6 are coupled in this order via the links 30 from a base side (other end side) toward a tip side (one end side) of the robot 2 and one link 30 further projects toward the tip side from the joint Q6. The arm 3 is configured by the joints Q1 to Q6 and the links 30 in this way. Then, the end effector 4 is attached to the tip of the arm 3 (tip of the link 30 projecting toward the one end side from the joint Q6). Note that the joint Q6 closest to the tip side out of six joints Q1 to Q6 coupled to each other via the links 30 is appropriately called a tip joint.

Each of the six joints Q1 to Q6 can rotate with one degree of freedom. Accordingly, the arm 3 can move the end effector 4 attached to the tip with six degrees of freedom by changing rotation angles q1 to q6 of the joints Q1 to Q6. Particularly, in this robot system 1, a reference point p1 is set on the tip joint Q6 or in a range of the base end side from the tip joint Q6, whereas reference points p2, p3 are set in a range of the end effector 4 side from the tip joint Q6. More specifically, in an example shown in FIG. 4, the reference point p1 is set on the link 30 between the joints Q3 and Q4, whereas the reference points p2, p3 are set on the end effector 4. The rotation angles q1 to q6 of the joints Q1 to Q6 are adjusted based on detection results of the reference points p1 to p3 by the cameras C1, C2 and the location and posture of the end effector 4 in a three dimensions are controlled. On this occasion, marks such as LEDs (Light Emitting Diodes) may be attached to the respective reference points p1 to p3 to improve visibility in the cameras C1, C2.

That is, the cameras C1, C2 are positioned to capture destinations pd1 to pd3 of the reference points p1 to p3 in fields of view thereof and capture positional deviations $\Delta$p1 to $\Delta$p3 between the reference points p1 to p3 and the destinations pd1 to pd3 in mutually different planes ($\Delta$p1=pd1−p1, $\Delta$p2=pd2−p2, $\Delta$p3 =pd3−p3 ). Specifically, the cameras C1, C2 are, for example, so arranged that the image planes IM1, IM2 are perpendicular to each other, a YZ plane of a task coordinate system XYZ is imaged by the camera C1 and a ZX plane of the task coordinate system XYZ is imaged by the camera C2. The location and posture of the end effector 4 in the three dimensions are controlled by adjusting the rotation angles q1 to q6 of the joints Q1 to Q6 to reduce the positional deviations $\Delta$p1 to $\Delta$p3 between the reference points p1 to p3 and the destinations pd1 to pd3 detected from imaging results of the cameras C1, C2 (visual feedback).

In this visual feedback, the position control can be executed by using different degrees of freedom for the reference point p1 set on the link 30 between the joints Q3 and Q4 and for the reference points p2, p3 set on the end effector 4. As described above, the reference point p1 is set on the link 30 between the joints Q3 and Q4. In other words, the set position of the reference point p1 (specific reference position) is on the base side from the joint Q4 (specific joint), at which the total count is three when counting the degree of freedom of the joint in order from the tip side, and on the tip side from the joint Q3, at which the total count is three when counting the degree of freedom of the joint in order from the base side. Thus, the position of the reference point p1 can be controlled with three degrees of freedom realized by the joints Q1 to Q3, whereas the positions of the reference points p2, p3 can be controlled with three degrees of freedom realized by the joints Q4 to Q6. In this way, it is possible to execute a control to separately use the degrees of freedom for the position control of the reference point p1 (three degrees of freedom by the joints Q1 to Q3) and the degrees of freedom for the position control of the reference points p2, p3 (three degrees of freedom by the joints Q4 to Q6).

Further, in this visual feedback, it is possible to adopt such a configuration that an imaging result of the robot 2 at a singular point is not fed back to the position control of the end effector 4. In a specific example, the cameras C1, C2 may be so arranged that the robot 2 at the singular point is outside the fields of view of the cameras C1, C2. In this way, it can be suppressed that the visual feedback is performed based on the imaging result of the robot 2 at the singular point and the control of the robot 2 becomes unstable.

Here, the notation of coordinate systems and each control amount used in the position control of the end effector 4 is described. As shown in FIG. 4, the three-dimensional task coordinate system configured by X, Y and Z axes perpendicular to each other with the Z axis as a vertical axis is defined for a task space where the end effector 4 operates. Thus, the positions of the reference points p1 to p3 are respectively given by three-dimensional vectors (p1x, p1y, p1z), (p2x, p2y, p2z) and (p3 x, p3 y, p3 z). Similarly, the destinations pd1 to pd3 are respectively given by three-dimensional vectors (pd1x, pd1y, pd1z), (pd2x, pd2y, pd2z) and (pd3x, pd3y, pd3z). Further, the positional deviations $\Delta$p1 to $\Delta$p3 are respectively given by three-dimensional vectors ($\Delta$p1x, $\Delta$p1y, $\Delta$p1z), ($\Delta$p2x, $\Delta$p2y, $\Delta$p2z) and ($\Delta$p3 x, $\Delta$p3 y, $\Delta$p3 z).

Note that the representative notation of the three reference points p1 to p3 by the reference points p without distinction, the representative notation of the three destinations pd1 to pd3 by the reference points pd without distinction and the representative notation of the three positional deviations $\Delta$pd1 to $\Delta$pd1 by the positional deviations $\Delta$pd without distinction are used as appropriate below. On this occasion, the positional deviation $\Delta$p is given by an equation $\Delta$p=pd−p using the reference point p and the destination pd. Further, corresponding to this, the position of the reference point p is expressed by a three-dimensional vector (px, py, pz), the position of the destination pd is expressed by a three-dimensional vector (pdx, pdy, pdz) and the deviation $\Delta$p is expressed by a three-dimensional vector ($\Delta$px, $\Delta$py, $\Delta$pz).

The rotation angles q of the joints Q of the robot 2 are expressed by a vector (q1, q2, q3, q4, q5, q6) including the rotation angle qn of the joint Qn as each component. Here, the notation of joints Q is the collective notation of the joints Q1 to Q6 and "n" is a number for distinguishing the joint (n=1, 2, 3, 4, 5, 6). Further, target angles qd (=qd1, qd2, qd3, qd4, qd5, qd6) are the rotation angles q of the joints Q when all the reference points p1 to p3 coincide with the corresponding destinations pd1 to pd3 thereof. Furthermore, torques $\tau$ applied to the joints Q of the robot 2 are expressed by a vector ($\tau$1, $\tau$2, $\tau$3, $\tau$4, $\tau$5, $\tau$6) including a torque $\tau$n acting on the joint Qn as each component.

The above is description of the notation of the coordinate systems and the control amounts. Next, the position control of the end effector 4 is described in detail. The robot system 1 according to the second embodiment also has the electrical configuration shown in FIG. 2. A position control similar to the one for converging the position p of the end effector 4 to the target position pd in the first embodiment is executed for each of the reference points p1 to p3 (p) and the reference points p1 to p3 (p) are converged toward the destinations pd1 to pd3 (pd) thereof. The following description is made, centering on a configuration different from the first embodiment with the description of the configuration common to the first embodiment omitted as appropriate.

In the robot system 1, a motor Mn for driving the joint Qn is provided for each of the joints Q1 to Q6, and an encoder En for detecting a rotational position of the motor Mn is provided for each of the motors M1 to M6. A controller 5 adjusts the rotation angles q of the joints Q of the robot 2 by controlling each of the motors M1 to M6. Particularly, to perform the aforementioned visual feedback, the controller 5 detects the positional deviations $\Delta$p (=pd−p) of the reference points p from the imaging results of the reference points p by the cameras Ci (external sensors). On this occasion, the controller 5 detects the positional deviations $\Delta$p while controlling panning/tiling of the cameras Ci so that the destinations pd1 to pd3 are captured in the fields of view with bringing, e.g. geometric centers of gravity of the destinations pd1 to pd3 into coincidence with or proximity to the origins of the coordinate systems of the cameras Ci (centers of the image planes IMi). Note that the set positions of the reference points p on the robot 2 are stored in advance in a memory of the controller 5 (storage).

Further, in parallel with the detection of the positional deviations $\Delta$p of the reference points p, the controller 5 detects angular deviations $\Delta$q (=qd−q) of the joints Q from outputs of the encoders E1 to E6 (internal sensors). Then, the controller 5 calculates the torques τ based on the positional deviations Δp (=pd−p) and the angular deviations Δq (qd−q). Then, the motors M1 to M6 apply the torques τ to the joints Q, thereby adjusting the rotation angles q of the joints Q. As just described, the detection results of the cameras Ci and the encoders En are fed back to the torques i to control the position of the end effector 4 in this embodiment.

Also in the second embodiment, the position control of the end effector 4 is executed in accordance with the block diagram of FIG. 3. Accordingly, the torques τ to be applied to the joints Q are determined based on the control law of Equation 14 derived from Equations 1 to 13. Note that, as described above, three reference points p1 to p3 are provided for the robot 2. Thus, the term for executing the proportional control on the positional deviations Δp (fourth term of Equation 14) is given by a linear combination of terms for executing a proportional control on each positional deviation Δp1 to Δp3, and the terms for executing the integral control on the positional deviations Δp (fifth term of Equation 14) is given by a linear combination of terms for executing an integral control on each positional deviation Δp1 to Δp3. As a result, an equation for obtaining the torques τ applied to the joint Q can be rewritten from Equation 14 into the following equation.

$$\tau = \tilde{g}(\tilde{q}_d) + G_P(\tilde{q}_d - \tilde{q}) - G_D\dot{\tilde{q}} + G_{pc}\sum_{j=1}^{3} \delta_j \tilde{J}_j^T \tilde{\Phi}_j(pd_j - p_j) + $$

$$G_I \int_{t_0}^{t} \sum_{j=1}^{3} \delta_j \tilde{J}_j^T \tilde{\Phi}_j(pd_j - p_j) dt \sum_{j=1}^{3} \delta_j = 1$$

[Equation 15]

j=1, 2, 3
$p_j$: REFERENCE POINT P1, P2, P3
$p_{dj}$: DESTINATION Pd1, Pd2, Pd3
$G_{pc}$: POSITIONAL FEEDBACK GAIN MATRIX
$G_I$: INTEGRAL FEEDBACK GAIN MATRIX
$\delta_j > 0$: WEIGHT COEFFICIENT FOR REFERENCE POINT $P_j$
$\tilde{J}_j^T$: TRANSPOSED JACOBIAN MATRIX (TRANSPOSED MATRIX OF JACOBIAN MATRIX) CONTAINING ERROR FOR REFERENCE POINT $P_j$
$\tilde{\Phi}_j$: MATRIX $\tilde{\Phi}$ (p) FOR REFERENCE POINT $p_j$ Note that the fourth and fifth terms of Equation 15 are given by weighted averages of the result of (proportional/integral) operations on each positional deviation Δp1 to Δp3. Weight coefficients δ1 to δ3 of these weighted averages have a positive value greater than zero when the corresponding reference points p1 to p3 are in the fields of view of the both cameras C1, C2 and are zero when the corresponding reference points p1 to p3 are outside the field of view of either one of the cameras C1, C2 and the visual feedback for the reference points p1 to p3 outside the field(s) of view does not work.

As described above, in this embodiment, the position of the end effector 4 is controlled by moving three or more reference points p1 to p3, which is set for the robot 2 and includes at least two points p2, p3 set for the end effector 4 side from the tip joint Q6, toward the respective destinations pd1 to pd3. Specifically, the reference points p1 to p3 are imaged in a state where the destinations pd1 to pd3 of the respective reference points p1 to p3 are captured in the fields of view and the positional deviations Δp1 to Δp3 between the reference points p1 to p3 and the destinations pd1 to pd3 are obtained. In parallel with this, the rotation angles q1 to q6 of the joints Q1 to Q6 are detected and the angular deviations Δq between the detected angles q and the target angles qd are obtained. Then, the torques based on the positional deviations Δp1 to Δp3 (torques given by the fifth term of Equation 14 or 15) are calculated and the torques based on the angular deviations Δq (torques given by the second term of Equation 14 or 15) are calculated. Then, these torques are superimposed and applied to the joints Q. In such a configuration, even if the positional deviations Δp1 to Δp3 of the reference points p1 to p3 cannot be obtained from the imaging results, the rotation angles q of the joints Q can be detected. Thus, the joints Q are rotated by the torques based on the angular deviations Δq to move the reference points p1 to p3 toward the destinations pd1 to pd3, as a result, the end effector 4 can be moved toward the target position.

However, as described above, in the configuration where the torques based on the positional deviations Δp and the torques based on the angular deviations Δq are superimposed and applied to the joints Q, unless a kinematic operation is certain, the torques based on the positional deviations Δp may act on the torques based on the angular deviations Δq in an opposite direction to stop the rotation of the joints Q. In this case, the end effector 4 stops with the positional deviations Δp left.

Contrary to this, in this embodiment, the torques to be superimposed with the torques based on the angular deviations Δp are positional deviation integral torques obtained by performing the integral operation on values corresponding to the positional deviations Δp of the reference points p. Accordingly, if the rotation of the joints Q stops or are about to stop before the reference points preach the destinations pd due to an existence of an error in the kinematic operation, the positional deviation integral torques increase with time to rotate the joints Q that have stopped or are about to stop since the positional deviations Δp remain. These positional deviation integral torques keep the joints Q rotating to move the reference points p to the destination pd until the positional deviations Δp are finally eliminated. As a result, the end effector 4 can be moved to the target position. Thus, in this embodiment, even if there is an error in the kinematic operation, the end effector 4 can be reliably moved to the target position by the function of the torques based on the positional deviations Δp. As a result, highly accurate calibration is not required and loads of calibration can be reduced.

Particularly, in this embodiment, the positional deviation integral torques are calculated by the kinematic operation of performing the integral operation on the positional deviations Δp multiplied by the transposed Jacobian matrix. Contrary to this, according to this embodiment, the end effector 4 can be reliably moved to the target position even if there is an error in the kinematic operation. Thus, even if the transposed Jacobian matrix is uncertain and there is an error in the kinematic operation of obtaining the positional deviation integral torques, the end effector 4 can be reliably moved to the target position. Therefore, it is not particularly necessary to highly accurately carry out calibration to precisely obtain the transposed Jacobian matrix and loads of calibration can be reduced.

The above technical content can be understood as follows. That is, in the configuration where the torques based on the angular deviations Δq and the torques based on the positional deviations Δp are superimposed and applied to the joints Q, the both torques are balanced out to stop the rotation of the joints Q if there is an error in the kinematic operation. This is thought to be because a potential distribution in a task space has a minimum value at a position different from the target position and the end effector 4 falls to this minimum value if there is an error in the kinematic operation. Contrary to this, in the case of applying the above positional deviation integral torques to the joints Q, the end effector 4 can be moved to the target position by the action of the positional deviation integral torques that increase with time. Thus, even in the case where the minimum value is located at a position different from the target position due to an error in the kinematic operation, the end effector 4 can be reliably moved to the target position. As a result, highly accurate calibration is not required and loads of calibration can be reduced.

According to this embodiment, if there is the positional deviation $\Delta p$ between the reference point p and the destination pd, the positional deviation integral torque acts on the joints Q and the end effector 4 can be moved to the target position. In the above description, an error in the kinematic operation is cited as a cause of these positional deviations $\Delta p$. However, in this embodiment, regardless of a cause of the positional deviation $\Delta p$, the reference point p is moved to the destination pd to eliminate the positional deviation $\Delta p$ if there is any positional deviation $\Delta p$. That is, positional deviations $\Delta p$ due to the uncertainty of the term for gravitational force compensation and the values of the target angles qd, detected rotation angles q or the like can be eliminated by the action of the positional deviation integral torque. Thus, only if the positional deviation ($\Delta p = pd - p$) of the reference point p is obtained, the end effector 4 can be moved to the target position by converging the reference point p toward the destination pd. As a result, there are few parameters required to be accurate, therefore loads of calibration are very light and calibration can be omitted in some cases.

Further, in this embodiment, the position of the end effector 4 is controlled by moving three or more reference points p1 to p3, which is set for the robot 2 and includes at least two points p2, p3 set for the end effector 4, toward the respective destinations pd1 to pd3. As a result, it is possible to properly control the end effector 4 to the target location and posture in the three dimensions.

In the configuration where three or more reference points p1 to p3 are moved to the destinations pd1 to pd3, there may occur a problem of being difficult to converge all the reference points p1 to p3 to the respective destinations pd1 to pd3 thereof depending on a positional relationship of the set positions of the reference points p1 to p3 and the destinations pd1 to pd3. Particularly, such a problem is likely to occur when all the reference points p1 to p3 are set on the end effector 4 side from the tip joint Q6. This point is described, giving a specific example.

Figure 5:
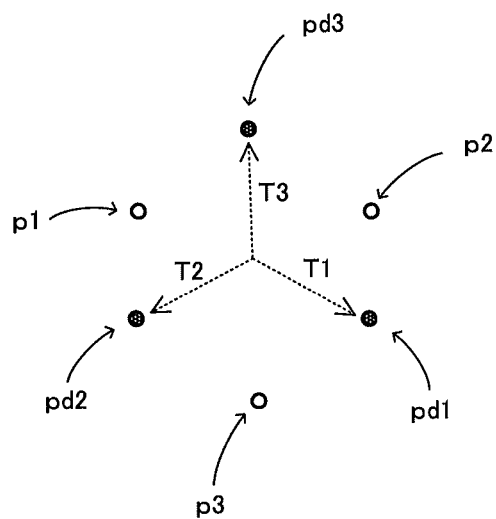
FIG. 5 is a diagram showing an example of states of torques acting on the end effector in the process of moving the reference points to the destinations thereof.

FIG. 5 is a diagram showing an example of states of torques acting on the end effector in the process of moving the reference points to the destinations thereof. That is, a positional relationship between the reference points p1 to p3 and the destinations pd1 to pd3 possibly established in the process of moving the reference points p1 to p3 to the destinations pd1 to pd3 is illustrated in FIG. 5. If a state of FIG. 5 is reached, a torque T1 generated based on the positional deviation $\Delta p1$ and directed from the reference point p1 to the destination pd1, a torque T2 generated based on the positional deviation $\Delta p2$ and directed from the reference point p2 to the destination pd2 and a torque T3 generated based on the positional deviation $\Delta p3$ and directed from the reference point p3 to the destination pd3 are balanced out each other, therefore the end effector 4 stops.

In other words, the end effector 4 falls in a local minimum in a potential distribution of a task space with the positional deviations $\Delta p1$ to $\Delta p3$ left. For this, in the configuration where all the reference points p1 to p3 are set on the end effector 4 side from the tip joint Q6, degrees of freedom for moving all the reference points p1 to p3 are common, therefore it has been difficult to move the end effector 4 out of the local minimum.

Contrary to this, in this embodiment, the specific reference point p1 is set on the tip joint Q6 or on the other end side from the tip joint Q6. In the case of providing some reference point(s) (specific reference point p1) on the tip joint Q6 or on the other end side from the tip joint Q6, it is easy to destroy a balance of the torques T1 to T3 as described above, move the end effector 4 out of the local minimum and converge all the reference points p1 to p3 to the destinations pd1 to pd3 thereof.

Particularly, in this embodiment, the specific reference point p1 is set on the specific joint Q4 or on other end side (base side) from the specific joint Q4, at which the total count is equal to or more than three when counting the degree of freedom of the joint in order from the one end side (tip side). In such a configuration, the specific reference point p1 can be properly converged to the destination pd1 with the degrees of freedom on the other end side from the specific joint Q4 (degrees of freedom by the joints Q1 to Q3). Further, the reference point p2, p3 set on the end effector 4 side from the specific reference point p1 can be properly converged to the destination pd2, pd3 with three or more degrees of freedom on the specific joint Q4 and on the one end side from the specific joint Q4 (degrees of freedom by the joints Q4 to Q6). That is, the control using different degrees of freedom for the specific reference point p1 and for the other reference points p2, p3 can be executed. As a result, even if the end effector 4 falls in the local minimum as described above, the balance of the torques T1 to T3 as described above can be easily destroyed by displacing the reference point p1 and the reference points p2, p3 respectively with different degrees of freedom. As a result, it becomes easy to move the end effector 4 out of the local minimum and properly converge the respective reference points p1 to p3 to the destinations.

Further, in this embodiment, the specific reference point p 1 is set on the one end side (tip side) from the joint Q3, at which the total count is equal to or more than three when counting the degree of freedom of the joint in order from the other end side (base side). This enables the specific reference point p1 to be more reliably converged to the destination pd1 with three or more degrees of freedom. Particularly, in such a configuration, the reference point p 1 and the reference points p2, p3 can be respectively relatively freely displaced with different three or more degrees of freedom. As a result, the balance of the torques T1 to T3 as described above can be easily destroyed and it becomes easy to move the end effector 4 out of the local minimum and properly converge the respective reference points p1 to p3 to the destinations.

Note that, in this specification, an expression that the joint at which the total count is "equal to or more than N" when counting the degree of freedom of the joint in order is used as appropriate. This expression indicates the first joint at which the total count is "equal to or more than N" when counting the degree of freedom of the joint in order. Thus, as described above, the joint at which the total count is "equal to or more than three" when counting the degree of freedom of the joint in order from the one end side is only the joint Q4, and the other joints Q1 to Q3 are not considered as such. Similarly, the joint having a successive total of "three or more" degrees of freedom of the joints from the other end side is only the joint Q3, and the other joints Q4 to Q6 are not considered as such.

As shown in Equation 15, the positional deviation integral torques are given by the linear combination of the values of integral on the positional deviations $\Delta p1$ to $\Delta p3$ of the respective reference points p1 to p3, particularly by the weight averages multiplied by the weight coefficients $\delta j$ ($\delta 1$, $\delta 2$, $\delta 3$). On this occasion, the weight coefficient $\delta$ of the value of integral on the specific reference point p1 (value of integral on the positional deviation $\Delta p1$) may be set larger than those $\delta 2$, $\delta 3$ of the values of integral on the reference points p2, p3 (values of integral on the positional deviations $\Delta p2$, $\Delta p3$ ) ($\delta 1 > \delta 2$ and $\delta 1 > \delta 3$). In such a configuration, after the specific reference point p1 corresponding to the larger weight coefficient $\delta 1$ is more quickly converged to the destination pd1, the reference points p2, p3 set on the end effector 4 side from the tip joint Q6 can be converged to the destinations pd2, pd3. Thus, the degrees of freedom on the specific joint Q4 and on the one end side from the specific joint Q4, i.e. degrees of freedom on the end effector 4 side from the specific reference point p1 can be substantially used only to move the reference points p2, p3. Therefore, these reference points p2, p3 can be reliably converged to the destinations pd2, pd3 with sufficient degrees of freedom.

As described above, in the second embodiment, the robot system 1 corresponds to an example of the "robot system" of the invention, the robot 2 corresponds to an example of the "robot" of the invention, the controller 5, the cameras Ci and the encoders En function in cooperation as an example of the "robot control apparatus" of the invention, the controller 5 corresponds to an example of the "computer" of the invention, the recording medium 6 corresponds to an example of the "recording medium" of the invention, and the program 7 corresponds to an example of the "program" of the invention. Further, the cameras Ci correspond to an example of an "imager" of the invention, the encoders En correspond to an example of a "displacement amount detector" of the invention, the controller 5 functions as examples of a "positional deviation acquirer", an "application amount calculator" and the "drive controller" of the invention. Further, in Equations 14 and 15, the torques given by the fifth term correspond to an example of the "first application amount" of the invention, the torques given by the second term corresponds to an example of the "second application amount" of the invention and the torques given by the third term corresponds to an example of the "third application amount" of the invention. Further, the reference points p1 to p3 correspond to an example of "reference positions" of the invention, the specific reference point p1 corresponds to a "specific reference position" of the invention, the tip joint Q6 corresponds to an example of a "tip joint" of the invention, and the specific joint Q4 corresponds to an example of a "specific joint" of the invention.

As described above, the respective reference points p are reliably converged to the destinations pd by superimposing the torques obtained by performing the integral operation on the positional deviations $\Delta p$ and the torques obtained by performing the proportional operation on the angular deviations $\Delta q$. Note that the invention is not limited to the second embodiment described above and various changes other than the aforementioned ones can be made without departing from the gist of the invention. For example, in the above second embodiment, the marks such as LEDs attached to the robot 2 are set as the reference points p1 to p3. However, characteristic parts (e.g. tips, holes) of the robot 2 may be set as the reference points p1 to p3.

Further, the control law expressed by Equation 15 can also be appropriately changed. In a specific example, a change to omit the first term for gravitational force compensation, the third term for executing the derivative control on the rotation angles q or the fourth term for executing the proportional control on the positional deviations $\Delta p$ can be made.

Further, specific set values of the weight coefficients $\delta 1$ to $\delta 3$ of weighted addition in Equation 15 can also be appropriately changed. Accordingly, the weight coefficients for the other reference points p2, p3 may be set larger than the reference point $\delta 1$ for the specific reference point p1 or all the weight coefficients $\delta 1$ to $\delta 3$ may be set at the same value.

Further, the set position of the specific reference point p1 on the robot 2 can also be appropriately changed. Thus, the specific reference point p1 can be set at a suitable position on the tip joint Q6 or on the base end side from the tip joint Q6 on the robot 2. For example, the specific reference point p1 may be set on the tip joint Q6 or on the specific joint Q4.

Further, the set positions of the reference points p2, p3 on the robot 2 can also be appropriately changed. Thus, the reference point p2 or p3 may be provided on the link 30 projecting toward the tip side from the tip joint Q6.

Furthermore, it is not always necessary to provide the specific reference point p1 as described above. Thus, for example, all the reference points p1 to p3 may be provided on the end effector 4.

Further, the number of the reference points p is not limited to three as in the above description. Thus, four or more reference points p may be set for the robot 2.

Further, the number of degrees of freedom of the robot 2 is also not limited to six as in the above description. Thus, the invention can be applied also to a robot 2 having seven or more degrees of freedom.

Further, in the above second embodiment, any of the joints Q1 to Q6 has one degree of freedom. However, the invention can be applied also to a robot 2 configured using joint Q having a plurality of degrees of freedom.

Further, in the above second embodiment, panning/tiling of the cameras Ci is controlled to bring, for example, the geometric centers of gravity of the destinations pd1 to pd3 into coincidence with or proximity to the origins of the coordinate systems of the cameras Ci (centers of the image planes IMi). However, a control mode of the positional relationship between the destinations pd1 to pd3 and the coordinate systems of the cameras Ci is not limited to this.

Further, in the above embodiments, the feedback amount from the external loop Lx becomes zero and the external loop Lx for the corresponding reference point p is not performed if the reference point p is outside the fields of view. After the corresponding reference point enters the fields of view of the cameras Ci, the external loop Lx is performed. On this occasion, an operation until the reference point p enters the fields of view of the cameras Ci may be taught to the robot 2 in advance. Such teaching suffices to be rough since it is sufficient to move the reference point p into the fields of view of the cameras Ci. However, it is, of course, all right to execute a control to track a trajectory of the end effector 4 until entry into the fields of view of the cameras Ci and locate the end effector 4 in the fields of view of the cameras Ci.

Alternatively, it is also possible not to perform the external loop Lx while the reference point p is outside a predetermined range from the destination pd and to use only the internal loop Lq even if the reference point p enters the fields of view of the cameras Ci. In this case, the external loop Lx may be performed after the reference point p enters the predetermined range from the destination pd. In such a configuration, the reference point p can be highly accurately positioned with the external loop Lx at a final stage of a movement to the destination pd.

Stability

Next, the stability of the control law given by Equation 15 is studied. Robot dynamics are generally given by the following equation.

$$R(q)\ddot{q} + (\tfrac{1}{2}\dot{R}(q) + S(q,\dot{q}))\dot{q} + g(q) = \tau \quad [\text{Equation 16}]$$

R(q): (3×3) INERTIA MATRIX
S(q,q̇): (3×3) ALTERNATE MATRIX OF NONLINEAR TERM
g(q): (3×1) VECTOR SHOWING GRAVITY TERM
τ: (3×1) VECTOR SHOWING JOINT TORQUE
q: (3×1) VECTOR SHOWING ROTATION ANGLE OF JOINT

Here, a variable $\xi$ is defined as follows.

$$\xi = \frac{\tilde{g}(\tilde{q}_d) - g(q_d) + G_P(\tilde{q}_d - q_d)}{g_I} + \int_{t_0}^{t} \sum_{j=1}^{3} \delta_j \tilde{J}_j^T \Phi_j (pd_j - p_j) dt \quad [\text{Equation 17}]$$

DEFINED AS $G_I = g_I I$
I: IDENTITY MATRIX

The following equation is obtained by substituting Equation 17 into Equation 16.

$$R(q)\ddot{q} = -\left(\tfrac{1}{2}\dot{R}(q) + S(q,\dot{q})\right)\dot{q} - g(q) + g(q_d) + G_P(q_d - q) - G_D \dot{q} + G_{pc} \sum_{j=1}^{3} \delta_j \tilde{J}_j^T \Phi_j (pd_j - p_j) + g_I \xi \quad [\text{Equation 18}]$$

Note that it is assumed that the following conditions constantly hold.

$$\|pd_j - p_j\| \le c_1 \quad [\text{Equation 19}]$$
$$\|K\| \le c_2$$
$$G_P = g_P I$$
$$G_D = g_D I$$
$$G_{pc} = g_{pc} I$$
$$G_I = g_I I$$
$$\operatorname{rank} \sum_{j=1}^{3} \delta_j \tilde{J}_j^T \Phi_j = 6$$

$C_1, C_2$: POSITIVE CONSTANT
$K = \tilde{J}_j^T \tilde{\Phi}_j$;
$\| \; \|$: EUCLIDEAN NORM Here, the following function V is considered as a Lyapunov function candidate.

$$V = \tfrac{1}{2}(q_d - q)^T G_P (q_d - q) + \sum_{j=1}^{3} \tfrac{1}{2}(pd_j - p_j)^T (\delta_j G_{pc} + \alpha \delta_j G_D)(pd_j - p_j) + \quad [\text{Equation 20}]$$

-continued $$\tfrac{1}{2}\dot{q}^T R(q)\dot{q} + \tfrac{1}{2}\alpha g_I \xi^T \xi - \sum_{j=1}^{3} \alpha \delta_j (pd_j - p_j)^T \tilde{\Phi}_j^T \tilde{J}_j R(q)\dot{q} + g_I (q_d - q)^T \xi$$

V>0 holds if α is properly small and $g_I$ is sufficiently smaller than $G_P$.

Further, a time derivative of the function V is given by the following equation.

$$\dot{V} = -\dot{q}^T G_P (q_d - q) - \sum_{j=1}^{3} \dot{p}_j (k_p \delta_j I + \alpha G_D)(pd_j - p_j) + \quad [\text{Equation 21}]$$
$$\dot{q}^T R(q)\ddot{q} + \tfrac{1}{2}\dot{q}^T \dot{R}(q)\dot{q} + \alpha g_I \xi^T \dot{\xi} - \sum_{j=1}^{3} \alpha \delta_j (pd_j - p_j)^T \tilde{\Phi}_j^T \tilde{J}_j R(q)\ddot{q} + \sum_{j=1}^{3} \alpha \delta_j \dot{p}_j^T \tilde{\Phi}_j^T \tilde{J}_j R(q)\dot{q} - \sum_{j=1}^{3} \alpha \delta_j (pd_j - p_j)^T \tfrac{d}{dt}(\tilde{\Phi}_j^T \tilde{J}_j R(q))\dot{q} - g_I \dot{q}^T \xi + g_I (q_d - q)^T \dot{\xi}$$

By transforming Equation 21, the time derivative of the function V is given by the following equation.

$$\dot{V} = -g_D \dot{q}^T \dot{q} - \alpha g_{pc} \lambda^T \lambda - (\alpha g_P - g_I)(q_d - q)^T \lambda + \quad [\text{Equation 22}]$$
$$g_{pc} \dot{q}^T \sum_{j=1}^{3} \delta_j (\tilde{J}_j^T \tilde{\Phi}_j - J_j^T)(pd_j - p_j) + g_D \dot{q}^T \sum_{j=1}^{3} \delta_j (\tilde{J}_j^T \tilde{\Phi}_j - J_j^T)(pd_j - p_j) + \dot{q}^T (g(q_d) - g(q)) - \alpha \lambda^T (g(q_d) - g(q)) + \alpha \lambda^T \left(\tfrac{1}{2}\dot{R} + S\right)\dot{q} + \alpha \sum_{j=1}^{3} \delta_j \dot{p}_j^T \tilde{\Phi}_j^T \tilde{J}_j R(q)\dot{q} - \alpha \sum_{j=1}^{3} \delta_j (pd_j - p_j)^T \tfrac{d}{dt}(\tilde{\Phi}_j^T \tilde{J}_j R(q))\dot{q}$$

Here, a variable λ is defined as follows.

$$\lambda = \sum_{j=1}^{3} \delta_j \tilde{J}_j^T \Phi_j (pd_j - p_j) \quad [\text{Equation 23}]$$

On this occasion, the following inequality is obtained for the time derivative of the function V.

$$\dot{V} \le -g_D \dot{q}^T \dot{q} - \alpha g_{pc} \lambda^T \lambda + \quad [\text{Equation 24}]$$
$$g_{pc} \sum_{j=1}^{3} \delta_j \dot{q}^T (\tilde{J}_j^T \Phi_j - J_j^T)(pd_j - p_j) +$$

-continued $$\alpha g_D \sum_{j=1}^{3} \delta_j \dot{q}^T (\tilde{J}_j^T \tilde{\Phi}_j - J_j^T)(pd_j - p_j) -$$

$$(\alpha g_D - g_I)(q_d - q)^T \lambda +$$

$$(c_1 + c_3)\|\dot{q}\|^2 + (c_2 + c_4)\|q_d - q\|^2$$

The following relationship is utilized in obtaining the above inequality.

$$\dot{q}^T(g(q_d) - g(q)) \leq c_1 \|\dot{q}\|^2 + c_2 \|q_d - q\|^2 \alpha \quad \text{[Equation 25]}$$

$$\lambda^T \left( \frac{1}{2} \dot{R}(q) + S(q, \dot{q})\dot{q} + \alpha \sum_{j=1}^{3} \tilde{p}_j^T \tilde{\Phi}_j^T \tilde{J}_j R(q) \dot{q} - \right.$$

$$\left. \alpha \sum_{j=1}^{3} (pd_j - p_j)^T \frac{d}{dt} (\tilde{\Phi}_j^T \tilde{J}_j R(q)) \dot{q} \right) \leq$$

$$c_3 \|\dot{q}\|^2 \alpha \lambda^T (g(q_d) - g(q)) \leq c_4 \|q_d - q\|^2$$

$C_1, C_2, C_3, C_4$: POSITIVE CONSTANT

The following equation is obtained by Taylor expansion about the target angle qd.

$$p_j(q) = p_j(q_d) + \frac{\partial p_j}{\partial q}(q - q_d) + \Delta_j(q - q_d) \quad \text{[Equation 26]}$$

Further, the following equation is obtained from Equation 26.

$$pd_j - p_j = (Jd_j + \Delta_j)(q_d - q)$$

$$Jd_j = J_j(q) \quad \text{[Equation 27]}$$

$\Delta_j$: HIGH-ORDER COEFFICIENT AT TAYLOR EXPANSION

Further, it is assumed that the following equation holds.

$$\|Jd_j - \Delta_j\| \leq C_5$$

$$\|\tilde{J}_j^T \tilde{\Phi}_j - J_j^T\| \leq C_\varepsilon \quad \text{[Equation 28]}$$

$C_5, C_\varepsilon$: POSITIVE CONSTANT

On this occasion, the following inequality is obtained for the second term of Equation 24 for giving the time derivative of the function V.

$$k_P \sum_{j=1}^{3} \delta_j \dot{q}^T (\tilde{J}_j^T \tilde{\Phi}_j - J_j^T)(pd_j - p_j) = \quad \text{[Equation 29]}$$

$$k_P \sum_{j=1}^{3} \dot{q}^T (\tilde{J}_j^T \tilde{\Phi}_j - J_j^T)(Jd_j + \Delta_j)(q_d - q) \leq$$

$$\frac{3}{2} k_P c_\varepsilon \, c_5 (\|\dot{q}\|^2 + \|q_d - q\|^2)$$

Further, the following inequality is obtained for the third term of Equation 24 for giving the time derivative of the function V.

$$\alpha \sum_{j=1}^{3} \delta_j \, \dot{q}^T (G_D \tilde{J}_j^T \tilde{\Phi}_j - J_j^T G_D)(pd_j - p_j) \leq \quad \text{[Equation 30]}$$

$$\frac{3}{2} \alpha \, g_D c_\varepsilon \, c_5 (\|\dot{q}\|^2 + \|q_d - q\|^2)$$

On this occasion, it is important that the following equation can hold in Equation 24 so that the time derivative of the function V becomes negative.

$$(q_d - q)^T \lambda \leq 0 \quad \text{[Equation 31]}$$

Here, the following equation holds.

$$(q_d - q)^T \lambda = (q_d - q)^T \sum_{j=1}^{3} \delta_j \, \tilde{J}_j^T \tilde{\Phi}_j (pd_j - p_j) \quad \text{[Equation 32]}$$

$$= (q_d - q)^T \sum_{j=1}^{3} \delta_j \, \tilde{J}_j^T \tilde{\Phi}_j (Jd_j + \Delta_j)(q_d - q)$$

Thus, a condition of Equation 31 can be transformed into the following condition.

$$\sum_{j=1}^{3} \delta_j \, \tilde{J}_j^T \tilde{\Phi}_j (Jd_j + \Delta_j) > 0 \quad \text{[Equation 33]}$$

Finally, the following inequality is obtained for the time derivative of the Lyapunov function.

$$\dot{V} \leq -\alpha g_{pc} \|\lambda\|^2 - \quad \text{[Equation 34]}$$

$$\left[ \left( 1 - \frac{3}{2} \alpha c_\varepsilon c_5 \right) g_D - c_1 - c_3 - \frac{3}{2} g_{pc} c_\varepsilon c_5 \right] \|\dot{q}\|^2 - \left[ \right.$$

$$(\alpha g_P - g_I) \lambda_{min}\left( \frac{\Omega + \Omega^T}{2} \right) - c_2 -$$

$$\left. c_4 - \frac{3}{2}(g_{pc} + \alpha g_D) c_\varepsilon c_5 \right] \|q_d - q\|^2$$

DEFINED AS $$\Omega = \sum_{j=1}^{3} \tilde{J}_j^T \tilde{\Phi}_j (J_{dj} + \Delta_j)$$

$\lambda_{min} A$: MINIMAL EIGENVALUE OF MATRIX A

On this occasion, the following equation is given as in Equation 33.

$$\sum_{j=1}^{3} \delta_j \, \tilde{J}_j^T \tilde{\Phi}_j (Jd_j + \Delta_j) > 0 \quad \text{[Equation 35]}$$

Accordingly, if the left side of Equation 35 is a positive definite matrix and Equation 35 is satisfied, the time derivative of the function V can be negative and the respective reference points p1 to p3 are stable at the destinations pd1 to pd3 thereof in the control law given by Equation 15. Thus, a setting mode and stability of the reference points p1 to p3 are considered next.

In the above second embodiment, the reference point p1 is set between the joints Q3 and Q4 and the reference points p2, p3 are set on the end effector 4 for the robot 2 having six degrees of freedom by coupling the joints Q1 to Q6. Since the joints Q4 to Q6 are not used to move the reference point p1 in this case, the following equation is obtained.

$$\dot{p}_1 = J_1 \dot{q} = [A_1 O]\dot{q} \quad \text{[Equation 36]}$$

$A_1$: 3×3 MATRIX
O: 3×3 MATRIX WITH ALL IT'S COMPONENT BEING ZERO
$[A_1 O]$: 3×6 MATRIX

Accordingly, the left side of Equation 35 can be given by the following equation.

$$\sum_{j=1}^{3} \delta_j \tilde{J}_j^T \Phi_j (Jd_j + \Delta_j) = \delta_1 \begin{bmatrix} \tilde{A}_1^T \\ O \end{bmatrix} \Phi_1 [A_1 + \Delta_1 O] + \begin{bmatrix} \tilde{A}_2^T \\ \tilde{B}_2^T \end{bmatrix} \Phi_2 \quad \text{[Equation 37]}$$

$$[A_2 + \Delta_2 \quad B_2 + \Delta_2] + \begin{bmatrix} \tilde{A}_3^T \\ \tilde{B}_3^T \end{bmatrix} \Phi_3 [A_3 + \Delta_3 \quad B_3 + \Delta_3]$$

Here, it is assumed that the following equation is satisfied.

$$\Phi_j \cong 1$$

$$\Delta_j \cong 0 \quad \text{[Equation 38]}$$

On this occasion, Equation 37 is equal to the following equation.

$$\begin{bmatrix} \delta_1 \tilde{A}_1^T A_1 + \delta_2 \tilde{A}_2^T A_2 + \tilde{A}_3^T A_3, & \delta_2 \tilde{A}_2^T B_2 + \delta_3 \tilde{A}_3^T B_3 \\ \delta_2 \tilde{B}_2^T A_2 + \delta_3 \tilde{B}_3^T A_3, & \delta_2 \tilde{B}_2^T B_2 + \delta_3 \tilde{B}_3^T B_3 \end{bmatrix} \quad \text{[Equation 39]}$$

Here, if the weight coefficient δ1 is set sufficiently larger than the other weight coefficients δ2, δ3, the following equation holds. That is, the respective reference points p1 to p3 are stable at the destinations pd1 to pd3 thereof.

$$\sum_{j=1}^{3} \delta_j \tilde{J}_j^T \Phi_j (Jd_j + \Delta_j) > 0 \quad \text{[Equation 40]}$$

It is assumed that the following equation is satisfied.

$$\tilde{A}_1^T A_1 > 0$$

$$\tilde{B}_2^T B_2 + \tilde{B}_3^T B_3 > 0 \quad \text{[Equation 41]}$$

Further, if all the three reference points p1 to p3 are set on the end effector 4, the following equation holds instead of Equation 38. Thus, if a matrix on the right side of the following equation is a positive definite matrix, the respective reference points p1 to p3 are stable at the destinations pd1 to pd3 thereof.

$$\sum_{j=1}^{3} \delta_j \tilde{J}_j^T \Phi_j (Jd_j + \Delta_j) = \quad \text{[Equation 42]}$$

$$\begin{bmatrix} \delta_1 \tilde{A}_1^T A_1 + \delta_2 \tilde{A}_2^T A_2 + \delta_3 \tilde{A}_3^T A_3, & \delta_1 \tilde{A}_1^T B_1 + \delta_2 \tilde{A}_2^T B_2 + \delta_3 \tilde{A}_3^T B_3 \\ \delta_1 \tilde{B}_1^T A_1 + \delta_2 \tilde{B}_2^T A_2 + \delta_3 \tilde{B}_3^T A_3, & \delta_1 \tilde{B}_1^T B_1 + \delta_2 \tilde{B}_2^T B_2 + \delta_3 \tilde{B}_3^T B_3 \end{bmatrix}$$

Alternatively, assuming that the position of the reference point p1 is controlled with three degrees of freedom realized by the joints Q1 to Q3 and the other reference points p2, p3 are mainly controlled with three degrees of freedom realized by the joints Q4 to Q6, the following equation using a partial Jacobian matrix can also be assumed.

$$\dot{p}_1 = J_1 \dot{q} = [A_1 O]\dot{q}$$

$$\tilde{J}_2 = [O \tilde{B}_2]$$

$$\tilde{J}_3 = [O \tilde{B}_3] \quad \text{[Equation 43]}$$

$B_2$: 3×3 MATRIX
$B_3$: 3×3 MATRIX
$[B_2 O]$: 3×6 MATRIX
$[B_3 O]$: 3×6 MATRIX

If Equation 35 is satisfied in this assumption, the respective reference points p1 to p3 are stable at the destinations pd1 to pd3 thereof in the control law given by Equation 15.

Others

Note that the invention is not limited to the second embodiment described above and various changes other than the aforementioned ones can be made without departing from the gist of the invention. For example, in the above embodiment, an estimate of a rotation matrix R of a coordinate is used in the torque calculation process. In the above description, a specific technique for obtaining the estimate of the rotation matrix R is not particularly mentioned. However, various techniques can be employed as the specific technique for obtaining the rotation matrix R. In a specific example, azimuth sensors, posture sensors or gyro sensors may be attached to the robot 2 and the cameras Ci and a positional relationship of the robot 2 and the camera Ci may be calculated from respective sensor outputs to obtain the estimate of the rotation matrix R. In such a configuration, regardless of an arrangement of the robot 2 and the cameras Ci, azimuth angles thereof are obtained. Thus, even if the robot 2 and the cameras Ci are suitably arranged according to user operability and the operability of the robot 2, the estimate of the rotation matrix R can be obtained from the azimuth angles of the robot 2 and the cameras Ci. Further, the positional relationship of the robot 2 and the cameras Ci may be, for example, automatically calculated by the program 7. Note that, in the case of using gyro sensors, the azimuth angles may be obtained from values of integral of the respective sensors after the directions of the respective sensors of the robot 2 and the cameras Ci are aligned in the same direction.

Further, in the above embodiment, the imaging result of the robot 2 at the singular point is not fed back to the position control of the end effector by arranging the cameras C1, C2 so that the robot 2 at the singular point is located outside the fields of view of the cameras C1, C2. However, such a configuration is not essential and the robot 2 at the singular point may be located in the fields of view of the cameras C1, C2.

Further, if the robot 2 at the singular point is located in the fields of view of the cameras C1, C2, it may be prevented that the imaging result of the robot 2 at the singular point is fed back to the position control of the end effector by changing the control mode by the controller 5. It can be suppressed by this that the control of the robot 2 becomes unstable due to the singular point.

Further, a specific transformation mode from the camera coordinate systems to the task coordinate system is not limited to the aforementioned contents and can be appropriately changed.

Further, the arrangement and number of the cameras Ci are not limited to the aforementioned contents and can be appropriately changed.

Further, the numbers, dimensions and operating directions of the links L1 to L3 and the joints Q constituting the robot 2 can also be appropriately changed from those shown in the above embodiments. Thus, prismatic joints can also be used as the joints Q. Incidentally, in applying the invention to the prismatic joints Q, "displacement amounts in directions of linear movement" may be detected instead of the "angles" and "forces" may be calculated instead of the "torques" to control movements of the prismatic joints Q.

EXAMPLES

Next, examples of the invention are shown. However, the invention is not limited by the following examples. Thus, the invention can be, of course, carried out while being appropriately changed within a range capable of conforming to the gist described above and below and any of such changes is included in the technical scope of the invention.

The result of an experiment of moving the end effector 4 to the target position pd using a 3DOF (Three Degrees Of Freedom) robot unit produced by MMSE (Man-Machine Synergy Effectors) and having a configuration similar to that of the robot 2 of FIG. 1 is shown below. Specifically, it was confirmed by this experiment that the end effector 4 could be moved to the target position pd in a state where calibration was carried out for none of internal parameters of the cameras C1, C2, external parameters of the cameras C1, C2, the positions of the cameras C1, C2 and a relationship between the robot 2 and the cameras C1, C2.

Note that the controller 5 for controlling the robot 2 was configured by an Intel Core i7 960 (CPU) and a DRAM (Dynamic Random Access Memory) of 4 GB, and cameras with 2 million pixels were used as the cameras C1, C2. The position p and the target position pd of the end effector 4 were detected by applying template matching to extraction results of edges of markers provided at the respective positions. Calibration of the robot 2 is allowed to have an error. Specifically, the values of the rotation angles q have an error of 5° with respect to 90° and the lengths of the links L1 to L3 have an error of within ±100 [mm].

Example 1

An equation expressing a control law of Example 1 is as follows.

$$\tau = \tilde{g}_{(\tilde{q}_d)} + G_P(\tilde{q}_d - q) - \quad \text{[Equation 44]}$$

$$G_D \dot{q} + \tilde{J}_0^T \left[ G_{P_c} \begin{bmatrix} {}^1u_d - {}^1u \\ {}^2u_d - {}^2u \\ \dfrac{{}^1v_d - {}^1v + {}^2v_d - {}^2v}{2} \end{bmatrix} + \right.$$

$$\left. G_I \int_{t_0}^{t} \begin{bmatrix} {}^1u_d - {}^1u \\ {}^2u_d - {}^2u \\ \dfrac{{}^1v_d - {}^1v + {}^2v_d - {}^2v}{2} \end{bmatrix} d\delta \right]$$

$\tilde{J}_0$: JACOBIAN MATRIX HAVING CONSTANT COMPONENT

As shown in Equation 44, in Example 1, a U1 axis component of the positional deviation in the coordinate system of the camera C1 is employed as an X axis component of the positional deviation Δp in the task coordinate system, a U2 axis component of the positional deviation in the coordinate system of the camera C2 is employed as a Y axis component of the positional deviation Δp in the task coordinate system, and an average of the U1, U2 axis components of the positional deviation in the coordinate systems of the cameras C1, C2 is employed as a Z axis component of the positional deviation Δp in the task coordinate system. Further, since a Jacobian matrix is not required to be accurate according to the invention as described above, each component of the Jacobian matrix suffices to be a suitable constant. Accordingly, the value of each component of the Jacobian matrix at the target angle qd can be employed.

Figure 7:
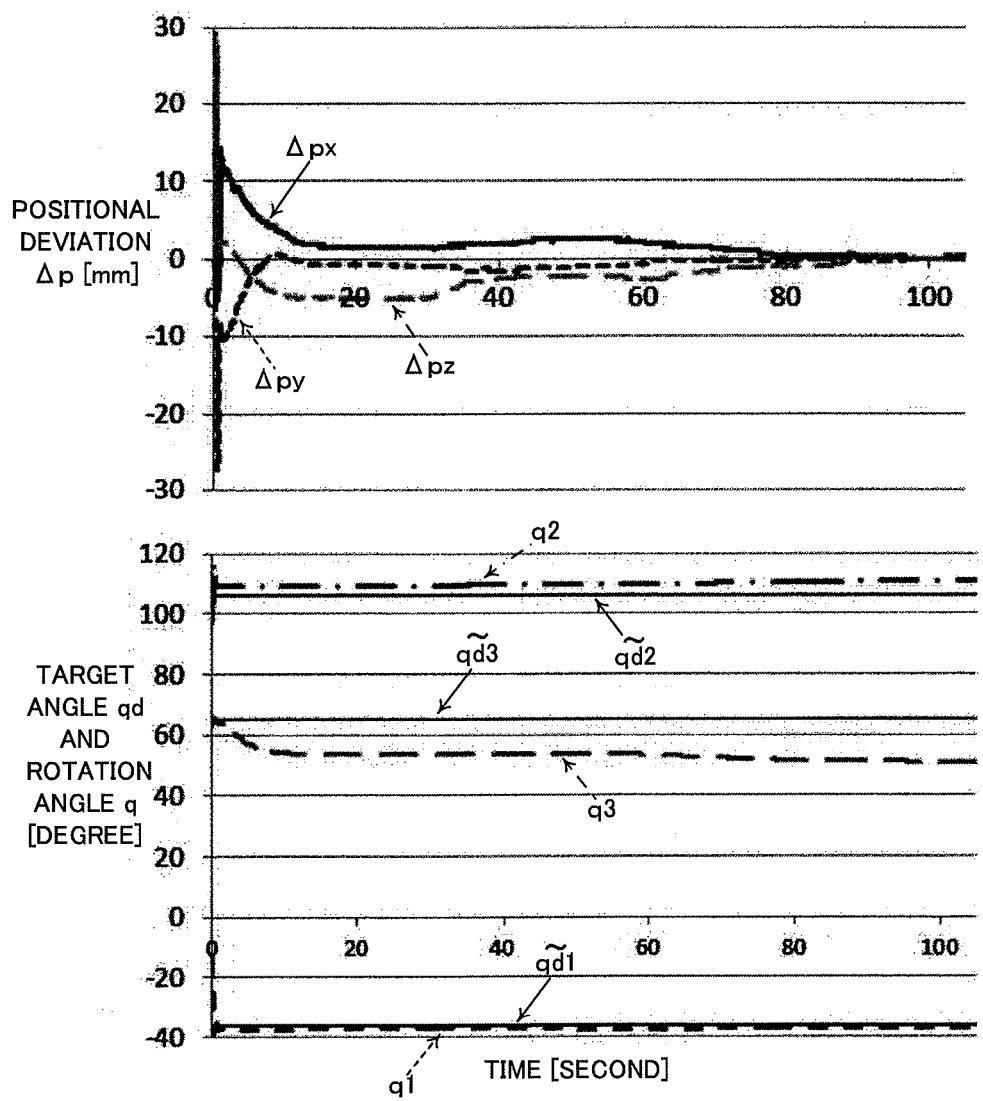
FIG. 7 is a graph showing experimental results in Example 1.

FIGS. 6 and 7 are graphs showing experimental results in Example 1. FIGS. 6 and 7 both show a graph having a horizontal axis expressing time and a vertical axis expressing the positional deviation Δp in an upper part and a graph having a horizontal axis expressing time and a vertical axis expressing the target angle and the rotation angle in a lower part. A component in each of X, Y and Z axes is shown for the positional deviation Δp. A difference between FIGS. 6 and 7 is a feedback gain. Particularly, an integral gain is set larger in the experiment of FIG. 6 than in the experiment of FIG. 7.

Each feedback gain in the experiment of FIG. 6 is as follows.

$$G_P = \text{diag}(0.18, 0.24, 0.15)$$

$$G_D = \text{diag}(2.5, 3.5, 2.0)$$

$$G_{Pc} = \text{diag}(0.010, 0.010, 0.010)$$

$$G_I = \text{diag}(0.00030, 0.00030, 0.00030) \quad \text{[Equation 45]}$$

diag: DIAGONAL MATRIX HAVING COMPONENT IN PARENTHESES AS ON-DIAGONAL ELEMENT

Each feedback gain in the experiment of FIG. 7 is as follows.

$$Q_P = \text{diag}(0.40, 0.60, 0.10)$$

$$G_D = \text{diag}(1.2, 1.8, 0.8)$$

$$G_{Pc} = \text{diag}(0.050, 0.050, 0.050)$$

$$G_I = \text{diag}(0.00010, 0.00010, 0.00010) \quad \text{[Equation 46]}$$

As shown in the upper graphs of FIGS. 6 and 7, the positional deviation Δp converges to about 1 pixel in both experimental results, in other words, the position of the end effector 4 can be controlled with an accuracy of about 0.3 [mm]. That is, the end effector 4 can be moved to the target position pd even if calibration is carried out for none of the internal parameters of the cameras C1, C2, the external parameters of the cameras C1, C2, the positions of the cameras C1, C2 and the relationship between the robot 2 and the cameras C1, C2.

Example 2

FIGS. 8 to 11 are graphs showing experimental results in Example 2. Notation in FIGS. 8 and 10 corresponds to that in the upper parts of FIGS. 6 and 7, and notation in FIGS. 9 and 11 corresponds to that in the lower parts of FIGS. 6 and 7. Time is in each figure is a time at which the control of the robot 2 was started. Two experimental results having different positional relationships of the cameras C1, C2 and paths of the end effector 4 are shown in this Example 2. It is the same as in Example 1 that calibration is omitted.

Figure 8:
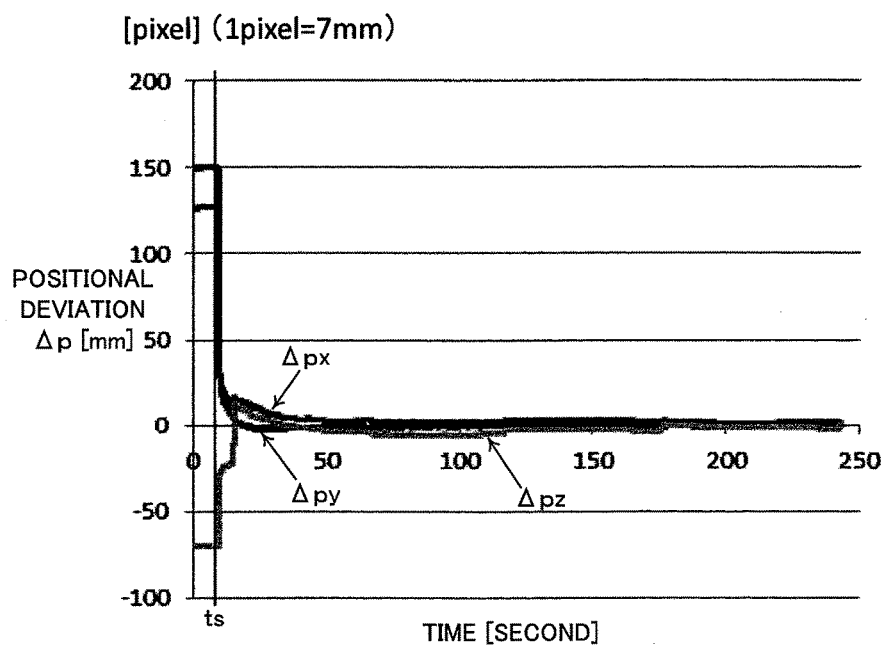
FIG. 8 is a graph showing experimental results in Example 2.
Figure 9:
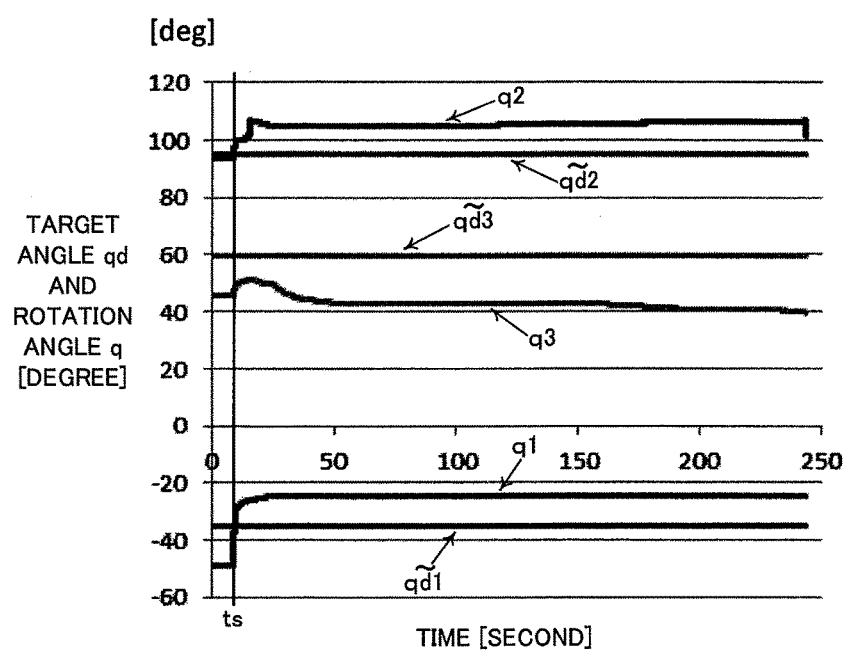
FIG. 9 is a graph showing experimental results in Example 2.

In an experiment shown in FIGS. 8 and 9, the cameras C1, C2 were so arranged that a range of 30 [cm] from the target position pd was substantially captured in the fields of view of the cameras C1, C2 and a movement of the end effector 4 was started inside the fields of view of the cameras C1, C2. In an experiment shown in FIGS. 10 and 11, the cameras C1, C2 were so arranged that a range of 5 [cm] from the target position pd was substantially captured in the fields of view of the cameras C1, C2 and a movement of the end effector 4 was started outside the fields of view of the cameras C1, C2.

Figure 10:
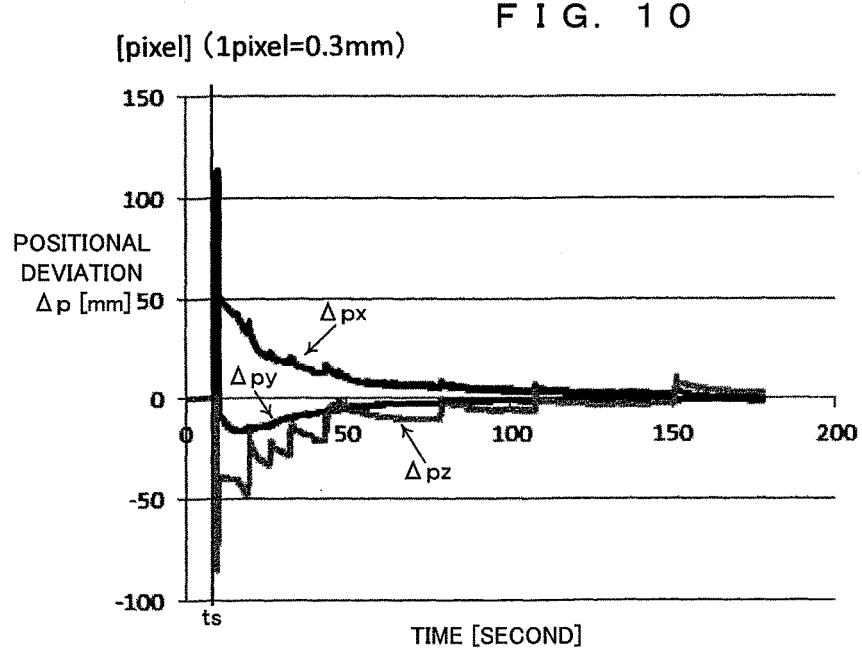
FIG. 10 is a graph showing experimental results in Example 2.
Figure 11:
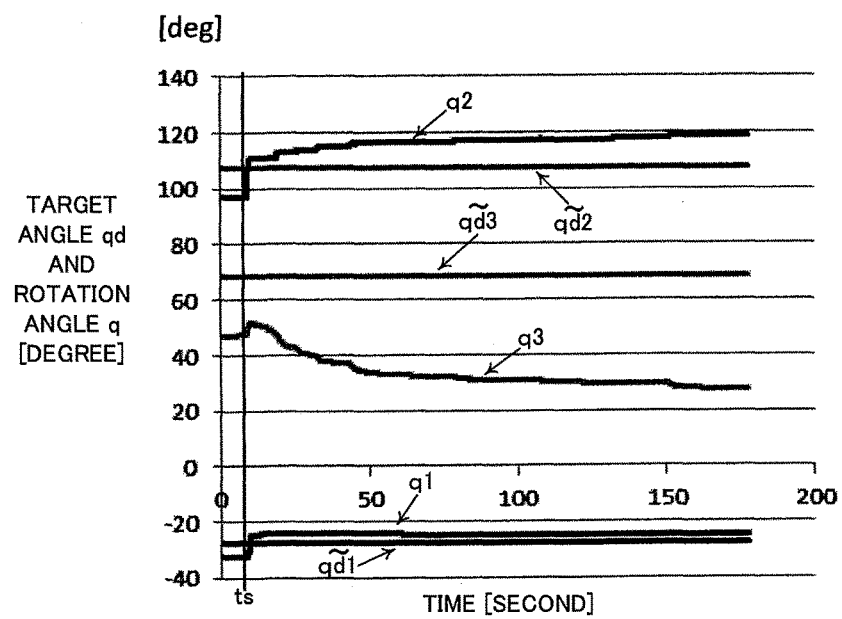
FIG. 11 is a graph showing experimental results in Example 2.

As shown in FIGS. 8 and 10, the positional deviation Δp can be converged regardless of distances between the cameras C1, C2 and the target position pd. Further, the positional deviation Δp can be converged regardless of whether the movement of the end effector 4 is started inside or outside the fields of view of the cameras C1, C2. From these results, it is found that the positional deviation Δ can be converged without being substantially affected by the positional relationships of the cameras C1, C2 and the paths of the end effector 4 and these relationships are sufficient to be rough.

Example 3

Figure 12:
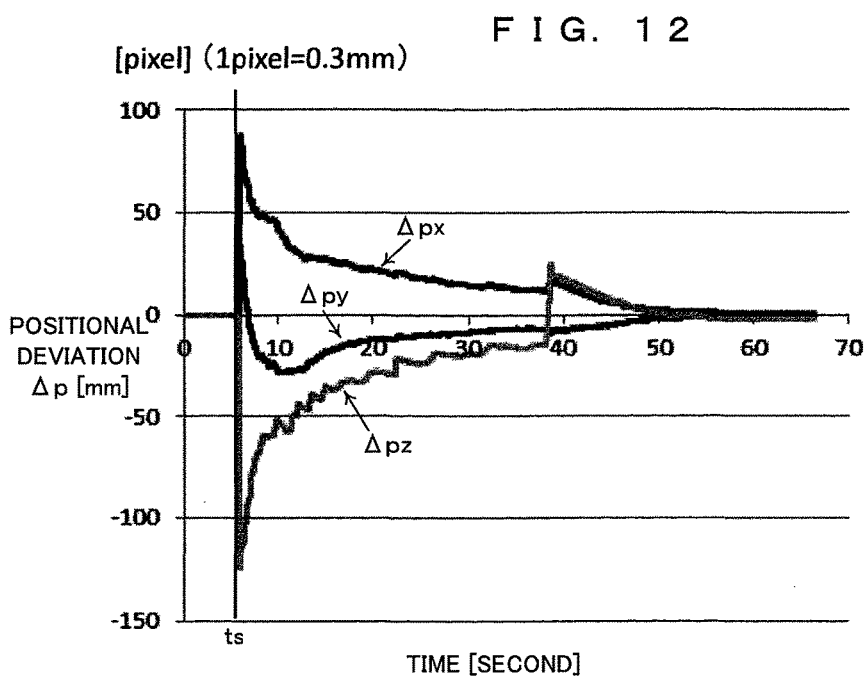
FIG. 12 is a graph showing an experimental result in Example 3.
Figure 13:
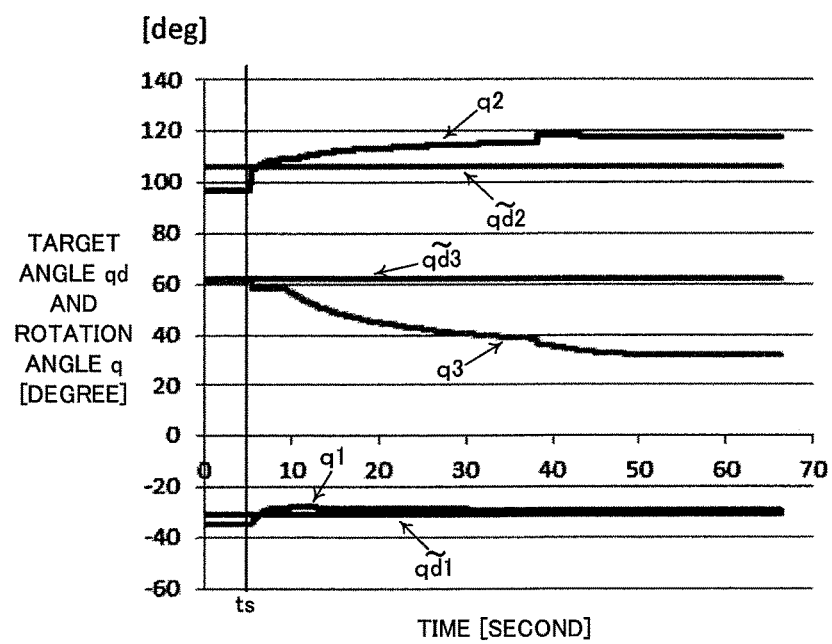
FIG. 13 is a graph showing an experimental result in Example 3.

FIGS. 12 and 13 are graphs showing an experimental result in Example 3. Note that notation in FIG. 12 corresponds to that in the upper parts of FIGS. 6 and 7, and notation in FIG. 13 corresponds to that in the lower parts of FIGS. 6 and 7. Time is in each figure is a time at which the control of the robot 2 was started. In this Example 3, the proportional gain for the positional deviation Δp is set at zero and the proportional control is not executed for the positional deviation Δp. Note that the cameras C1, C2 were so arranged that a range of 5 [cm] from the target position pd was substantially captured in the fields of view of the cameras C1, C2 and a movement of the end effector 4 was started outside the fields of view of the cameras C1, C2. It is the same as in Example 1 that calibration is omitted. As shown in FIG. 12, it is found that the positional deviation Δp can be converged by the integral control for the positional deviation Δp even if the proportional control is not executed for the positional deviation Δp.

Examples 1 to 3 described above show the result of a simulation using the robot configured similarly to the robot 2 of FIG. 1. Next, the result of a simulation of moving the reference points p set on the robot 2 to the destinations pd using a robot configured similarly to the robot 2 of FIG. 4 is described. Specifically, it was confirmed by this simulation that the end effector 4 could be moved to the target position pd by converging the reference points p to the destinations pd in a state where calibration was carried out for none of the internal parameters of the cameras, the external parameters of the cameras, the positions of the cameras and the relationship between the robot 2 and the cameras.

Further, in carrying out this simulation, it is possible to use an Intel Core i7 960 (CPU) and a DRAM (Dynamic Random Access Memory) of 4 GB as the controller 5 for controlling the robot 2 and use cameras with 2 million pixels as the cameras C1, C2. Calibration of the robot 2 was allowed to have an error. Specifically, an error of 2.0% was introduced to joint angles and joint angular velocities, and an error of 5.0% was introduced to the lengths of the links. Note that in this Example, "p" in the above embodiment is changed to "x" and "j" in the above embodiment is changed to "i".

Example 4

As in the above embodiment, in Example 4, the reference point p1 (specific reference point) is set between the joints Q3 and Q4 and the reference points p2, p3 are set on the end effector 4. An equation expressing a control law of Example 4 is as follows.

$$\tau = \tilde{g}(\tilde{q}_d) + G_P(\tilde{q}_d - \tilde{q}) - G_D\dot{\tilde{q}} + G_{Pc1}\tilde{J}_1^T(\tilde{q})\tilde{\Phi}_1(x_1)[x_{d1} - x_1] + \\ G_{Ic1}\int_{t_0}^{\infty}\tilde{J}_1^T(\tilde{q})\tilde{\Phi}_1(x_1)[x_{d1} - x_1]d\delta + \\ G_{Pc2}\tilde{J}_2^T(\tilde{q})\tilde{\Phi}_2(x_2)[x_{d2} - x_2] + \\ G_{Ic2}\int_{t_0}^{\infty}\tilde{J}_2^T(\tilde{q})\tilde{\Phi}_2(x_2)[x_{d2} - x_2]d\delta + \\ G_{Pc3}\tilde{J}_3^T(\tilde{q})\tilde{\Phi}_3(x_3)[x_{d3} - x_3] + \\ G_{Ic3}\int_{t_0}^{\infty}\tilde{J}_3^T(\tilde{q})\tilde{\Phi}_3(x_3)[x_{d3} - x_3]d\delta \quad \text{[Equation 47]}$$

Figures 14, 15:
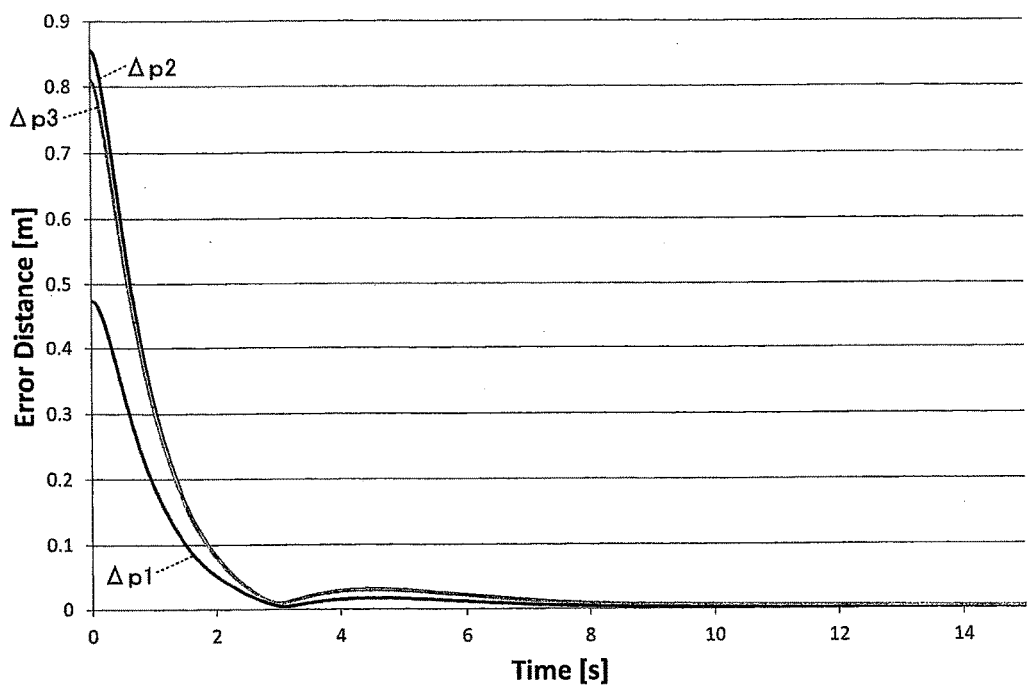
FIG. 14 is a table showing set values of gains in Example 4.
FIG. 15 is a graph showing a simulation result in Example 4.

Any of various gains in Equation 47 is a diagonal matrix and a diagonal component thereof is as shown in a table of FIG. 14. Here, FIG. 14 is a table showing set values of gains in Example 4. The diagonal component of each gain $G_P$, . . . corresponding to each of the joint angles q1 to q6 is shown in the table of FIG. 14. Here, the gain $G_D$ is set large to suppress vibration of the fifth joint Q5. Further, a proportional gain (=0.20) for the positional deviation Δp1 is set larger than proportional gains (=0.10) for the positional deviations Δp2, Δp3 and an integral gain (=0.006) for the positional deviation Δp1 is set larger than integral gains (=0.004) for the positional deviations Δp2, Δp3.

FIG. 15 is a graph showing a simulation result in Example 4. As shown in FIG. 15, any of the positional deviations Δp1 to Δp3 converges to zero and the end effector 4 has reached the target position. Further, since each gain for the positional deviation Δp1 is set larger than each gain for the positional deviations Δp2, Δp3, it is found that the positional deviation Δp1 more quickly converges than the positional deviations Δp2, Δp3.

Example 5

The set positions of the reference points p1 to p3 in Example 5 are the same as in Example 4. On the other hand, a control law of Example 5 does not include a term for the proportional control on the positional deviations Δp and is equivalent to the one in which the proportional gains for the positional deviations Δp are set at zero in Equation 47. Specific set values of the gains are as follows.

Figures 16, 17:
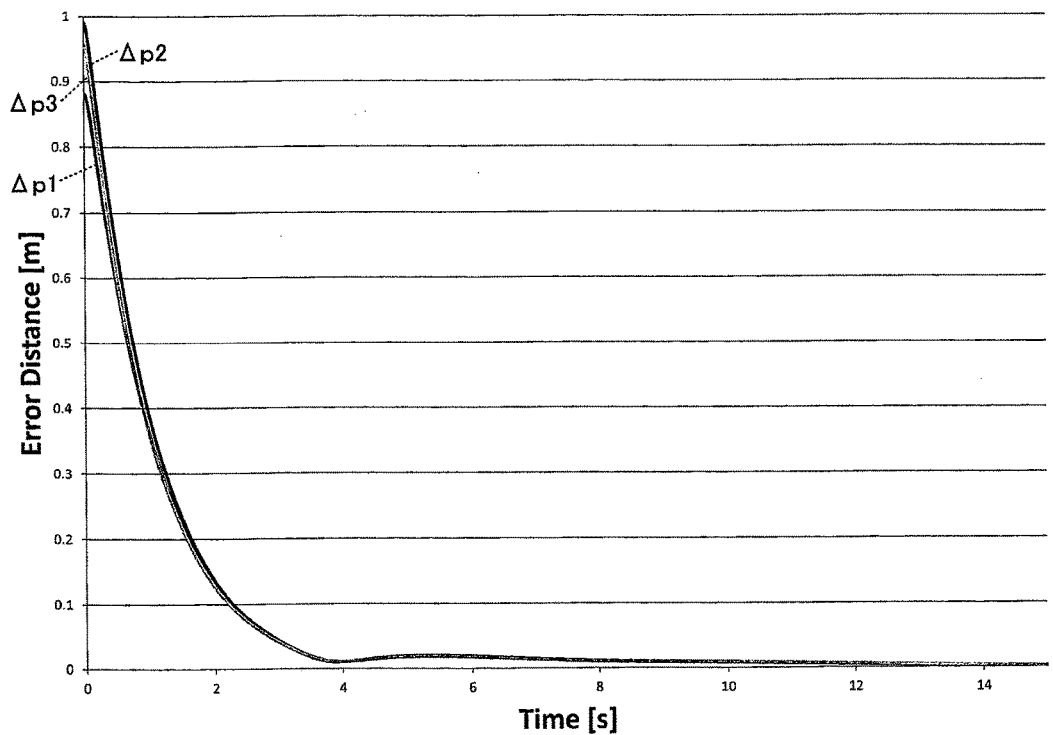
FIG. 16 is a table showing the set values of the gains in Example 5.
FIG. 17 is a graph showing a simulation result in Example 5.

FIG. 16 is a table showing the set values of the gains in Example 5. A diagonal component of each gain $G_P$, . . . corresponding to each of the joint angles q1 to q6 is shown in the table of FIG. 16. An integral gain (=0.032) for the positional deviation Δp2 is set larger than integral gains (=0.02) for the positional deviations Δp1, Δp3.

FIG. 17 is a graph showing a simulation result in Example 5. As shown in FIG. 17, any of the positional deviations Δp1 to Δp3 converges to zero and the end effector 4 is capable of reaching the target position.

Example 6

In Example 6, all the reference points p1 to p3 are set on the end effector 4. A control law of Example 6 is similar to Equation 47 shown in Example 4. Specific set values of the gains are as follows.

Figures 18, 19:
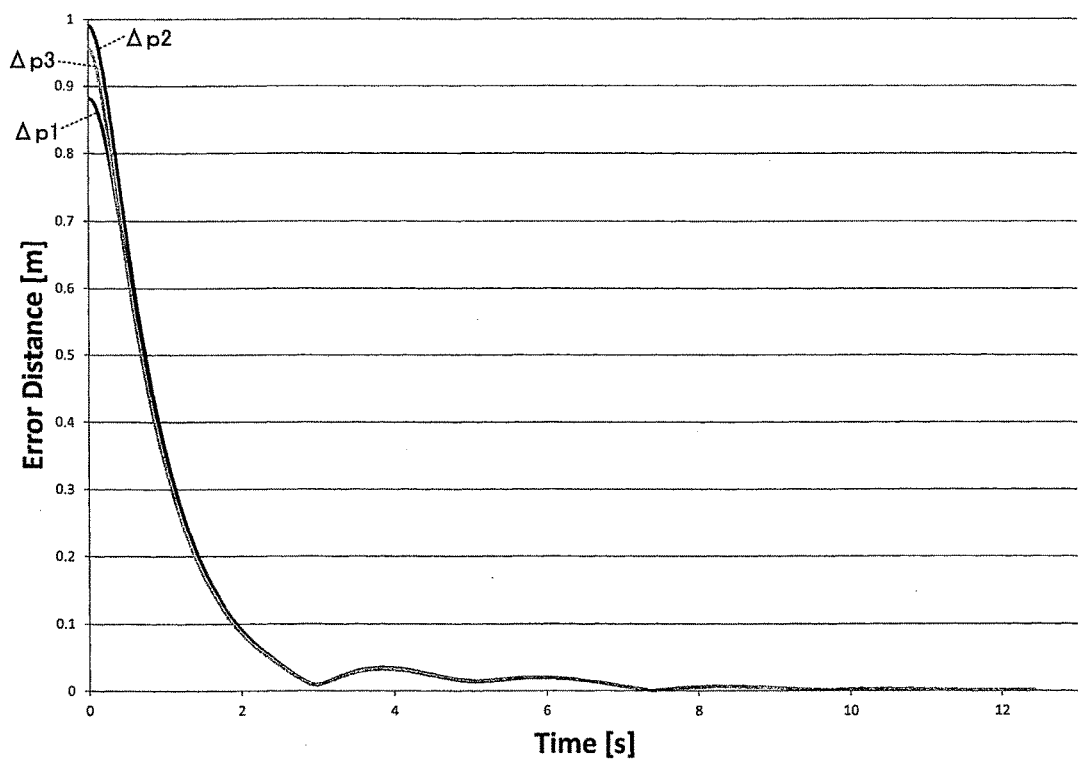
FIG. 18 is a table showing the set values of the gains in Example 6.
FIG. 19 is a graph showing a simulation result in Example 6.

FIG. 18 is a table showing the set values of the gains in Example 6. A diagonal component of each gain $G_P$, ... corresponding to each of the joint angles q1 to q6 is shown in the table of FIG. 18. Here, the gain $G_D$ is set large to suppress vibration of the fifth joint Q5.

FIG. 19 is a graph showing a simulation result in Example 6. As shown in FIG. 19, any of the positional deviations Δp1 to Δp3 converges to zero and the end effector 4 is capable of reaching the target position.

Example 7

In Example 7, all the reference points p1 to p3 are set on the end effector 4. A control law of Example 7 is similar to Equation 47. However, the reference points p and the destinations pd are detected by three cameras and coordinate transform from coordinate systems of the cameras to the task coordinate system is carried out based on the following equation.

$$\Phi_i(\tilde{x}_i)[x_{di} - x_i] = \begin{bmatrix} (^1u_{di} - ^1u_i + ^3u_{di} - ^3u_i)/2 \\ (^2u_{di} - ^2u_i + ^3v_{di} - ^3v_i)/2 \\ (^1v_{di} - ^1v_i + ^2v_{di} - 2v_i)/2 \end{bmatrix} \quad \text{[Equation 48]}$$

$(i = 1, 2, 3)$

Figures 20, 21:
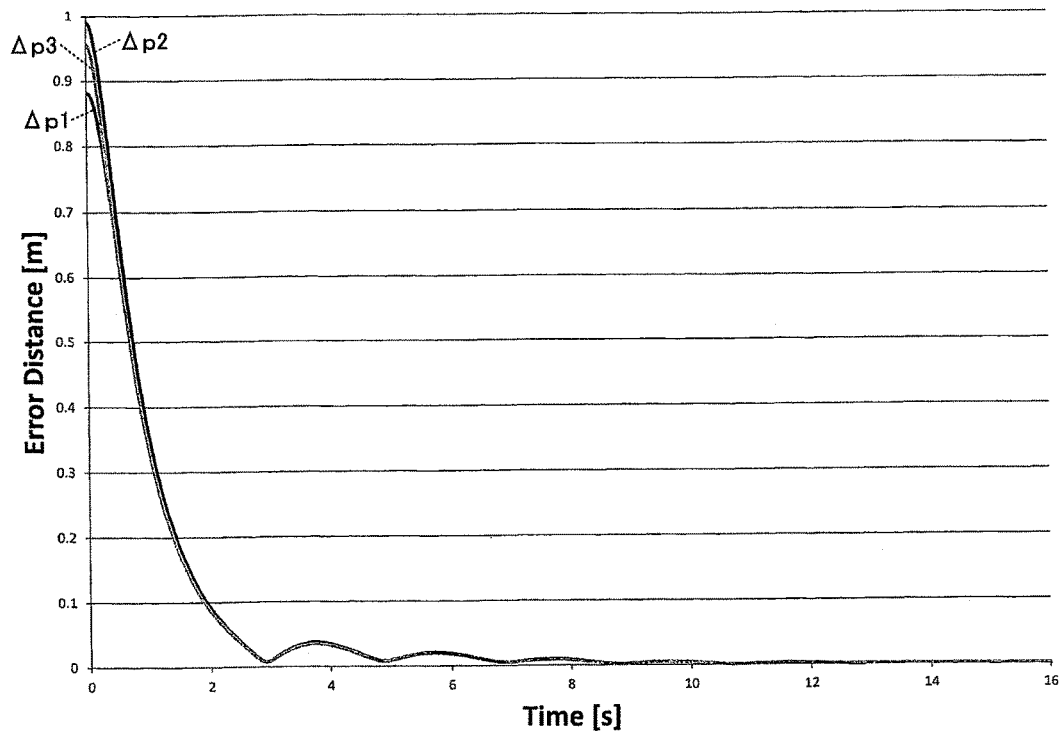
FIG. 20 is a table showing the set values of the gains in Example 7.
FIG. 21 is a graph showing a simulation result in Example 7.

FIG. 20 is a table showing the set values of the gains in Example 7. A diagonal component of each gain $G_P$, ... corresponding to each of the joint angles q1 to q6 is shown in the table of FIG. 20. FIG. 21 is a graph showing a simulation result in Example 7. As shown in FIG. 21, any of the positional deviations Δp1 to Δp3 converges to zero and the end effector 4 is capable of reaching the target position.

Example 8

In Example 8, five reference points p1 to p5 are all set on the end effector 4. A control law of Example 8 is as follows.

$$\tau = \quad \text{[Equation 49]}$$
$$\tilde{g}(\tilde{q}_d) + G_P(\tilde{q}_d - \tilde{q}) - G_D\dot{\tilde{q}} + G_{Pc1}\tilde{J}_1^T(\tilde{q})\Phi_1(\tilde{x}_1)[x_{d1} - x_1] +$$
$$G_{Ic1}\int_{t_0}^{\infty} \tilde{J}_1^T(\tilde{q})\Phi_1(\tilde{x}_1)[x_{d1} - x_1]dt +$$
$$G_{Pc2}\tilde{J}_2^T(\tilde{q})\Phi_2(\tilde{x}_2)[x_{d2} - x_2] +$$
$$G_{Ic2}\int_{t_0}^{\infty} \tilde{J}_2^T(\tilde{q})\Phi_2(\tilde{x}_2)[x_{d2} - x_2]dt +$$
$$G_{Pc3}\tilde{J}_3^T(\tilde{q})\Phi_3(\tilde{x}_3)[x_{d3} - x_3] +$$
$$G_{Ic3}\int_{t_0}^{\infty} \tilde{J}_3^T(\tilde{q})\Phi_3(\tilde{x}_3)[x_{d3} - x_3]dt +$$
$$G_{Pc4}\tilde{J}_4^T(\tilde{q})\Phi_4(\tilde{x}_4)[x_{d4} - x_4] +$$
$$G_{Ic4}\int_{t_0}^{\infty} \tilde{J}_4^T(\tilde{q})\Phi_4(\tilde{x}_4)[x_{d4} - x_4]dt +$$
$$G_{Pc5}\tilde{J}_5^T(\tilde{q})\Phi_5(\tilde{x}_5)[x_{d5} - x_5] +$$
$$G_{Ic5}\int_{t_0}^{\infty} \tilde{J}_5^T(\tilde{q})\Phi_5(\tilde{x}_5)[x_{d5} - x_5]dt$$

Further, the reference points p and the destinations pd are detected by three cameras and coordinate transform from coordinate systems of the cameras to the task coordinate system is carried out based on the following equation.

$$\Phi_i(\tilde{x}_i)[x_{di} - x_i] = \begin{bmatrix} (^1u_{di} - ^1u_i + ^3u_{di} - ^3u_i)/2 \\ (^2u_{di} - ^2u_i + ^3v_{di} - ^3v_i)/2 \\ (^1v_{di} - ^1v_i + ^2v_{di} - 2v_i)/2 \end{bmatrix} \quad \text{[Equation 50]}$$

$(i = 1, 2, 3, 4, 5)$

Figures 22, 23:
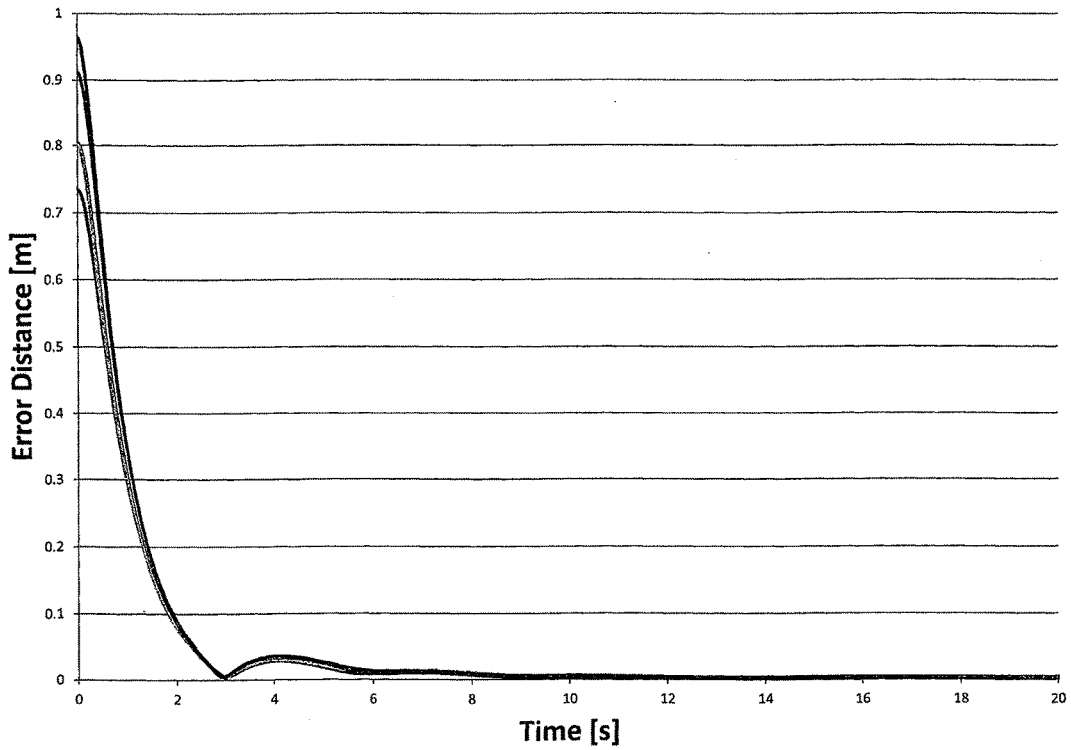
FIG. 22 is a table showing the set values of the gains in Example 8.
FIG. 23 is a graph showing a simulation result in Example 8.

FIG. 22 is a table showing the set values of the gains in Example 8. A diagonal component of each gain $G_P$, ... corresponding to each of the joint angles q1 to q6 is shown in the table of FIG. 22. FIG. 23 is a graph showing a simulation result in Example 8. As shown in FIG. 23, any of positional deviations Δp1 to Δp5 of five reference points p1 to p5 converges to zero and the end effector 4 is capable of reaching the target position.

INDUSTRIAL APPLICABILITY

This invention can be suitably applied to a technology on a robot configured to include a freely rotatable joint and move an end effector according to the rotation of the joint. For example, the invention can be applied in the case of assembling parts or packing box by use of the robot.

REFERENCE SIGNS LIST

1 ... robot system, 2 ... robot, 3 ... arm, 30 ... link, 4 ... end effector, 5 ... controller, 6 ... recording medium, 7 ... program, C1 ... camera, C2 ... camera, Ci camera, L1 ... link, L2 ... link, L3 ... link, Q1 to Q6 ... joint, Q ... joint, Qn ... joint, En ... encoder, p ... position (reference point), pd ... target position (destination), Δp positional deviation, q ... rotation angle, qd ... target angle, Δq ... angular deviation, τ ... torque, Lq ... internal loop, Lx ... external loop

The invention claimed is:

1. A robot control apparatus that controls a robot configured to include a freely displaceable joint and move an end effector according to a displacement of the joint, comprising:
an imager to image a reference position provided on the robot while capturing the reference position and a destination of the reference position in a field of view;
a displacement amount detector to detect a displacement amount of the joint;
a positional deviation acquirer to acquire a positional deviation from the destination for the reference position based on an imaging result of the imager;
an application amount calculator to calculate a first application amount from a result of acquiring a value of integral acquired by performing an integral operation on a value corresponding to the positional deviation for the reference position and a second application amount by performing a proportional operation on a value corresponding to a displacement amount deviation between a detected displacement amount by the displacement amount detector and a target displacement amount which is the displacement amount of the joint when the reference position coincides with the destination, each of said first and second application amount being a force or a torque applied to the joint to displace the joint; and a drive controller to move the reference position to the destination thereof by applying the first application amount and second application amount to the joint.

2. The robot control apparatus according to claim 1, controlling the robot to move the end effector according to a rotation of the joint, wherein:

the imager images the reference position provided on the end effector while capturing the reference position and the destination of the reference position;

the displacement amount detector is an angle detector to detect a rotation angle of the joint; and the application amount calculator is a torque calculator to calculate a first torque as the first application amount by performing the integral operation on the value corresponding to the positional deviation and a second torque as the second application amount by performing the proportional operation on a value corresponding to an angular deviation between a detected angle by the angle detector and a target angle as the target displacement amount which is the rotation angle of the joint when the reference position is at the destination; and the drive controller controls a joint drive mechanism to drive the joint so as to apply the first and second torques to the joint.

3. The robot control apparatus according to claim 2, wherein:

the application amount calculator calculates a third torque by performing a proportional operation on the value corresponding to the positional deviation; and the drive controller controls the joint drive mechanisms so that the third torque is further applied to the joint.

4. The robot control apparatus according to claim 2, wherein the application amount calculator calculates the first torque by performing the integral operation on the positional deviation multiplied by a transposed Jacobian matrix.

5. The robot control apparatus according to claim 1, controlling the robot in which the end effector is attached to one end of an arm that has a plurality of the joints and has six or more degrees of freedom and to which a plurality of the reference positions including three or more reference positions are set, wherein the imager images the three or more reference positions while capturing the destination of each of the three or more reference positions that include at least two positions set on the end effector side from a tip joint closest to one end side out of the joints in the field of view;

the positional deviation acquirer acquires the positional deviation for each reference position;

the application amount calculator calculates the first application amount and the second application amount for each joint; and the drive controller controls a location and a posture of the end effector in three dimensions by applying the first application amount and second application amount to the plurality of the joints to move the three or more reference positions toward the destinations thereof.

6. The robot control apparatus according to claim 5, wherein the drive controller moves each of the three or more reference positions including a specific reference position that is at a position other than the at least two positions and on the tip joint or on an other end side opposite to the one end side from the tip joint toward the destination thereof.

7. The robot control apparatus according to claim 6, wherein the specific reference position is set on a specific joint or on the other end side from the specific joint which is a third joint from the one end side out of the plurality of the joints.

8. The robot control apparatus according to claim 7, wherein the specific reference position is set on the one end side from the joint which is the third joint from the other end out of the plurality of the joints.

9. The robot control apparatus according to claim 7, wherein the application amount calculator calculates the first application amount by adding a result of multiplying the value of integral for the specific reference position by a $1^{st}$ weigh coefficient and a result of multiplying the value of integral for the reference positions other than the specific reference position by a $2^{nd}$ weigh coefficient, and the $1^{st}$ weigh coefficient is larger than the $2^{nd}$ weigh coefficient.

10. The robot control apparatus according to claim 5, wherein the application amount calculator calculates a third application amount from a result of acquiring a proportional value, which is acquired by performing a proportional operation on the value corresponding to the positional deviation, for each reference position and the drive controller further applies the third application amount to the plurality of the joints.

11. The robot control apparatus according to claim 5, wherein the application amount calculator calculates the first application amount by acquiring the value of integral by performing an integral operation on the positional deviation multiplied by a transposed Jacobian matrix.

12. A robot control method that controls a robot configured to include a freely displaceable joint and move an end effector according to a displacement of the joint, comprising:

a step of imaging a reference position provided on the robot while capturing the reference position and a destination of the reference position in a field of view;

a step of acquiring a positional deviation from the destination for the reference position based on an imaging result of the reference position;

a step of acquiring a detected displacement amount by detecting a displacement amount of the joint;

a step of calculating a first application amount from a result of acquiring a value of integral acquired by performing an integral operation on a value corresponding to the positional deviation for the reference position and a second application amount by performing a proportional operation on a value corresponding to a displacement amount deviation between the detected displacement amount and a target displacement amount which is the displacement amount of the joint when the reference position coincides with the destination, each of said first and second application amount being a force or a torque applied to the joint to displace the joint; and a step of moving the reference position to the destination thereof by applying the first application amount and second application amount to the joint.

13. A non-transitory computer-readable recording medium having recorded thereon a robot control program that causes a computer to control a robot configured to include a freely displaceable joint and move an end effector according to a displacement of the joint, causing the computer to perform:

a step of imaging a reference position provided on the robot while capturing the reference position and a destination of the reference position in a field of view;

a step of acquiring a positional deviation from the destination for the reference position based on an imaging result of the reference position;

a step of acquiring a detected displacement amount by detecting a displacement amount of the joint;

a step of calculating a first application amount from a result of acquiring a value of integral acquired by performing an integral operation on a value corresponding to the positional deviation for the reference position and a second application amount by performing a proportional operation on a value corresponding to a displacement amount deviation between the detected displacement amount and a target displacement amount which is the displacement amount of the joint when the reference position coincides with the destination, each of said first and second application amount being a force or a torque applied to the joint to displace the joint; and a step of moving the reference position to the destination thereof by applying the first application amount and second application amount to the joint.

14. A robot system, comprising:

a robot configured to include a freely displaceable joint and move an end effector according to a displacement of the joint;

an imager to image a reference position provided on the robot while capturing the reference position and a destination of the reference position in a field of view;

a displacement amount detector to detect a displacement amount of the joint;

a positional deviation acquirer to acquire a positional deviation from the destination for the reference position based on an imaging result of the imager;

an application amount calculator to calculate a first application amount from a result of acquiring a value of integral acquired by performing an integral operation on a value corresponding to the positional deviation for the reference position and a second application amount by performing a proportional operation on a value corresponding to a displacement amount deviation between a detected displacement amount by the displacement amount detector and a target displacement amount which is the displacement amount of the joint when the reference position coincides with the destination, each of said first and second application amount being a force or a torque applied to the joint to displace the joint; and a drive controller to move the reference position to the destination thereof by applying the first application amount and second application amount to the joint.

* * * * *